(12) United States Patent
Cohen et al.

(10) Patent No.: US 12,520,039 B2
(45) Date of Patent: Jan. 6, 2026

(54) SYSTEMS AND METHODS FOR OBTAINING A SUPER MACRO IMAGE

(71) Applicant: Corephotonics Ltd., Tel Aviv (IL)

(72) Inventors: Noy Cohen, Tel Aviv (IL); Gal Shabtay, Tel Aviv (IL); Ephraim Goldenberg, Tel Aviv (IL); Nadav Geva, Tel Aviv (IL); Udi Yakir, Tel Aviv (IL); Sagi Habani, Tel Aviv (IL); Dolev Danino, Tel Aviv (IL)

(73) Assignee: Corephotonics Ltd., Tel Aviv (IL)

( * ) Notice: Subject to any disclaimer, the term of this patent is extended or adjusted under 35 U.S.C. 154(b) by 0 days.

(21) Appl. No.: 19/280,576

(22) Filed: Jul. 25, 2025

(65) Prior Publication Data

US 2025/0350832 A1 Nov. 13, 2025

Related U.S. Application Data

(63) Continuation of application No. 18/937,103, filed on Nov. 5, 2024, now Pat. No. 12,395,733, which is a continuation of application No. 18/607,480, filed on Mar. 17, 2024, now Pat. No. 12,167,130, which is a continuation of application No. 18/346,243, filed on Jul. 2, 2023, now Pat. No. 11,962,901, which is a continuation of application No. 17/600,341, filed as
(Continued)

(51) Int. Cl.
| | |
|---|---|
| *H04N 23/67* | (2023.01) |
| *G02B 3/14* | (2006.01) |
| *G03B 13/36* | (2021.01) |
| *G06T 7/50* | (2017.01) |
| *H04N 23/69* | (2023.01) |
| *H04N 23/698* | (2023.01) |

(52) U.S. Cl.
CPC ............... *H04N 23/67* (2023.01); *G02B 3/14* (2013.01); *G03B 13/36* (2013.01); *G06T 7/50* (2017.01); *H04N 23/69* (2023.01); *H04N 23/698* (2023.01)

(58) Field of Classification Search
CPC ...... H04N 23/67; H04N 23/69; H04N 23/698; G02B 3/14; G03B 13/36; G06T 7/50
See application file for complete search history.

(56) References Cited

U.S. PATENT DOCUMENTS

| | | | | |
|---|---|---|---|---|
| 5,331,465 A | * | 7/1994 | Miyano | G02B 13/24 359/740 |
| 7,127,271 B1 | * | 10/2006 | Fujisaki | H04M 3/42042 455/556.1 |
| 9,241,111 B1 | * | 1/2016 | Baldwin | H04N 23/45 |

(Continued)

*Primary Examiner* — Shahbaz Nazrul
(74) *Attorney, Agent, or Firm* — Nathan & Associates; Menachem Nathan

(57) ABSTRACT

Systems comprising a Wide/Ultra-Wide camera, a folded Tele camera comprising an optical path folding element and a Tele lens module, a lens actuator for moving the Tele lens module for focusing to object-lens distances between 3.0 cm and 35 cm with an object-to-image magnification between 1:5 and 25:1, and an application processor (AP), wherein the AP is configured to analyze image data from the UW camera to define a Tele capture strategy for a sequence of Macro images with a focus plane slightly shifted from one captured Macro image to another and to generate a new Macro image from this sequence, and wherein the focus plane and a depth of field of the new Macro image can be controlled continuously.

20 Claims, 26 Drawing Sheets

Related U.S. Application Data application No. PCT/IB2021/054186 on May 15, 2021, now Pat. No. 11,770,609.

(60) Provisional application No. 63/177,427, filed on Apr. 21, 2021, provisional application No. 63/173,446, filed on Apr. 11, 2021, provisional application No. 63/164,187, filed on Mar. 22, 2021, provisional application No. 63/119,853, filed on Dec. 1, 2020, provisional application No. 63/110,057, filed on Nov. 5, 2020, provisional application No. 63/070,501, filed on Aug. 26, 2020, provisional application No. 63/032,576, filed on May 30, 2020.

(56) References Cited

U.S. PATENT DOCUMENTS

| | | | |
|---|---|---|---|
| 2006/0238621 A1* | 10/2006 | Okubo | H04N 23/6811 348/208.99 |
| 2013/0050543 A1* | 2/2013 | Higashitsutsumi | H04N 23/67 348/241 |
| 2018/0024329 A1* | 1/2018 | Goldenberg | H04N 23/57 |
| 2018/0184010 A1* | 6/2018 | Cohen | H04N 23/69 |
| 2018/0217475 A1* | 8/2018 | Goldenberg | G03B 3/10 |
| 2024/0244320 A1* | 7/2024 | Cohen | H04N 23/958 |
| 2024/0411209 A1* | 12/2024 | Shabtay | G02B 9/62 |

* cited by examiner

*170*

KNOWN ART

KNOWN ART

SYSTEMS AND METHODS FOR OBTAINING A SUPER MACRO IMAGE

CROSS REFERENCE TO RELATED APPLICATIONS

This application is a continuation from U.S. patent application Ser. No. 18/937,103 filed Nov. 5, 2024 (now allowed), which was a continuation from U.S. patent application Ser. No. 18/607,480 filed Mar. 17, 2024 (now U.S. Pat. No. 12,167,130), which was a continuation from U.S. patent application Ser. No. 18/346,243 filed Jul. 2, 2023 (now U.S. Pat. No. 11,962,901), which was a continuation from U.S. patent application Ser. No. 17/600,341 filed Sep. 30, 2021 (now U.S. Pat. No. 11,770,609), which was a 371 application from international application PCT/IB2021/054186 filed May 15, 2021, and is related to and claims priority from U.S. Provisional Patent Applications No. 63/032,576 filed May 30, 2020, No. 63/070,501 filed on Aug. 26, 2020, No. 63/110,057 filed Nov. 5, 2020, No. 63/119,853 filed Dec. 1, 2020, No. 63/164,187 filed Mar. 22, 2021, No. 63/173,446 filed Apr. 11, 2021 and No. 63/177,427 filed Apr. 21, 2021, all of which are expressly incorporated herein by reference in their entirety.

FIELD

The subject matter disclosed herein relates in general to macro images and in particular to methods for obtaining such images with mobile telephoto ("Tele" or "T") cameras.

BACKGROUND

Multi-cameras (of which a "dual-camera" having two cameras is an example) are now standard in portable electronic mobile devices ("mobile devices", e.g. smartphones, tablets, etc.). A multi-camera usually comprises a wide field-of-view (or "angle") $FOV_W$ camera ("Wide" or "W" camera), and at least one additional camera, with a narrower (than $FOV_W$) FOV (Tele camera with $FOV_T$), or with an ultra-wide field of view $FOV_{UW}$ (wider than $FOV_W$, "UW" camera). A known dual camera including a W camera and a folded T camera is shown in FIG. 10.

A "Macro-photography" mode is becoming a popular differentiator. "Macro-photography" refers to photographing objects that are close to the camera, so that an image recorded on the image sensor is nearly as large as the actual object photographed. The ratio of object size over image size is the object-to-image magnification. For system cameras such as digital single-lens reflex camera (DSLR), a Macro image is defined by having an object-to-image magnification of about 1:1 or larger, e.g. 1:1.1. In the context of mobile devices this definition is relaxed, so that also an image with an object-to-image magnification of about 10:1 or even 15:1 is referred to as "Macro image". Known mobile devices provide Macro-photography capabilities which are usually provided by enabling very close focusing with a UW camera, which has a relatively short effective focal length (EFL) of e.g. EFL=2.5 mm.

An UW camera can focus to close range required for Macro photography (e.g., 1.5 cm to 15 cm), but its spatial resolution is poor. For example, an UW camera with EFL=2.5 mm focused to an object at 5 cm (lens-object distance) will have approximately 19:1 object-to-image magnification. This according to the thin lens equation:

$$\frac{1}{EFL} = \frac{1}{u} + \frac{1}{v}$$

with EFL=2.5 mm, a lens-image distance v=2.6 mm and an object-lens distance of u=50 mm. Even when focused as close as 1.5 cm, the object-to-image magnification of the UW camera will be approximately 5:1. Capturing objects in Macro images from these short object-lens distances of e.g. u=5 cm or less is very challenging for a user—e.g. it may make framing of the image very hard, it may prohibit taking image of popular Macro objects such as living subjects (e.g. insects), and it may introduce shadows and obscure the lighting in the scene A dedicated Macro camera may be realized with a smartphone's Tele camera. Tele cameras focused to close objects have a very shallow depth of field (DOF). Consequently, capturing Macro images in Macro-photography mode is very challenging. Popular Macro objects such as flowers or insects exhibit a significant variation in depth, and cannot be imaged all-in-focus in a single capture. It would be beneficial to have a multi camera in mobile devices that capture Macro images (i) from a larger lens-object distance (e.g. 3.0-35 cm) and (ii) with larger object-to-image magnification (e.g. 1:5-25:1).

SUMMARY

In the following and for simplicity, the terms "UW image" and "W image", "UW camera" and "W camera", "UW FOV" (or $FOV_{uw}$) and "W FOV" (or $FOV_w$) etc. may be used interchangeably. A W camera may have a larger FOV than a Tele camera or a Macro-capable Tele camera, and a UW camera may have a larger FOV than a W camera. Typically but not limiting, $FOV_T$ may be 15-40 degrees, $FOV_W$ may be 60-90 degrees and $FOV_{uw}$ may be 90-130 degrees. A W camera or a UW camera may be capable to focus to object-lens distances that are relevant for Macro photography and that may be in the range of e.g. 2.5-15 cm. In some cases (e.g. between W and UW), FOV ranges given above may overlap to a certain degree.

In various embodiments, there are provided systems, comprising: a Wide camera for providing at least one Wide image; a Tele camera comprising a Tele lens module; a lens actuator for moving the Tele lens module for focusing to any distance or set of distances between 3.0 cm and 35 cm with an object-to-image magnification between 1:5 and 25:1; and an application processor (AP) configured to analyse image data from the Wide camera to define a capture strategy for capturing with the Tele camera a sequence of Macro images with a focus plane shifted from one captured Macro image to another captured Macro image, and to generate a new Macro image from this sequence. The focus plane and the DOF of the new Macro image can be controlled continuously. In some embodiments, the continuous control may be post-capture.

In some embodiments, the Tele camera may be a folded Tele camera comprising an optical path folding element (OPFE). In some embodiments, the Tele camera may be a double-folded Tele camera comprising two OPFEs. In some embodiments, the Tele camera may be a pop-out Tele camera comprising a pop-out lens In some embodiments, the focusing may be to object-lens distances of 3.0-25 cm, of 3.0-15 cm, or of 10-35 cm.

In some embodiments, the Tele camera may have an EFL of 7-10 mm, of 10-20 mm, or of 20-40 mm.

In some embodiments, the Tele capture strategy may be adjusted during capture of the sequence of Macro images based on information from captured Macro images.

In some embodiments, the information from captured Macro images is processed by a Laplacian of Gaussian analysis.

In some embodiments, the image data from the UW camera is phase detection auto-focus (PDAF) data.

In some embodiments, generation of the new Macro image may use a UW image as reference image.

In some embodiments, the generation of the new Macro image may use a video stream of UW images as reference image.

In some embodiments, the AP may be configured to automatically detect objects of interests (OOIs) in the sequence of captured Macro images and to generate the new Macro image when the OOIs are entirely in-focus.

In some embodiments, the AP may be configured to automatically detect OOIs in the UW image data and to generate the new Macro image when the OOIs are entirely in-focus.

In some embodiments, the AP may be configured to automatically detect OOIs in the sequence of input Macro images and to generate the new Macro image when specific image segments of the OOIs have a specific amount of forward de-focus blur and a specific amount of backward de-focus blur.

In some embodiments, the AP may be configured to automatically detect OOIs in the UW image data and to generate the new Macro image when specific image segments of the OOIs have a specific amount of forward de-focus blur and a specific amount of backward de-focus blur.

In some embodiments, the AP may be configured to calculate a depth map from the sequence of captured Macro images and to use the depth map to generate the new Macro image.

In some embodiments, the AP may be configured to provide the new Macro image with realistic artificial lightning scenarios.

In some embodiments, the AP may be configured to analyse of image data from the Wide camera to automatically select an object and to define the capture strategy for capturing the object with the Tele camera. In some embodiments, a focus peaking map may be displayed to a user for selecting an object which is captured with the Tele camera.

In some embodiments, the AP may be configured to calculate a depth map from the PDAF data and to use the depth map to generate the new Macro image.

In some embodiments, the Tele lens module may include one or more D cut lenses.

In some embodiments, a system may further comprise a liquid lens used for focusing to the object-lens distances of 4-15 cm. In some embodiments, the power of the liquid lens can be changed continuously in a range of 0-30 dioptre. In some embodiments, the liquid lens may be located on top of the folded Tele camera's OPFE. In some embodiments, the liquid lens may be located between the folded Tele camera's OPFE and the Tele lens module.

BRIEF DESCRIPTION OF THE DRAWINGS

Non-limiting examples of embodiments disclosed herein are described below with reference to figures attached hereto that are listed following this paragraph. The drawings and descriptions are meant to illuminate and clarify embodiments disclosed herein, and should not be considered limiting in any way. Like elements in different drawings may be indicated by like numerals. Elements in the drawings are not necessarily drawn to scale.

DETAILED DESCRIPTION

Tele cameras with a Macro-photography mode can switch to a Macro state by performing movements within the lens of the Tele camera, thus changing the lens's properties. Cameras with such capability are described for example in co-owned international patent applications PCT/IB2020/051405 and PCT/IB2020/058697. For example, FIGS. 19A and 19B in PCT/IB2020/051405 show two folded Tele camera states: one with the Tele lens in a first "Tele lens" state and the other with the Tele lens in a second "Macro lens" state. Because of the large EFL of a Tele camera and an image region of the image sensor that is smaller in the Macro mode than it is in the Tele mode, a "Macro lens" state may come with a small Macro FOV like FOV 198 below.

In the following, images are referred to as "Macro images", if they fulfil both of the two criteria:
  Object-to-image magnification of 1:5-25:1.
  Captured at an object-lens distance in the range of 30 mm-350 mm with a camera having an EFL in the range of 7 mm-40 mm.

Figure 1A:
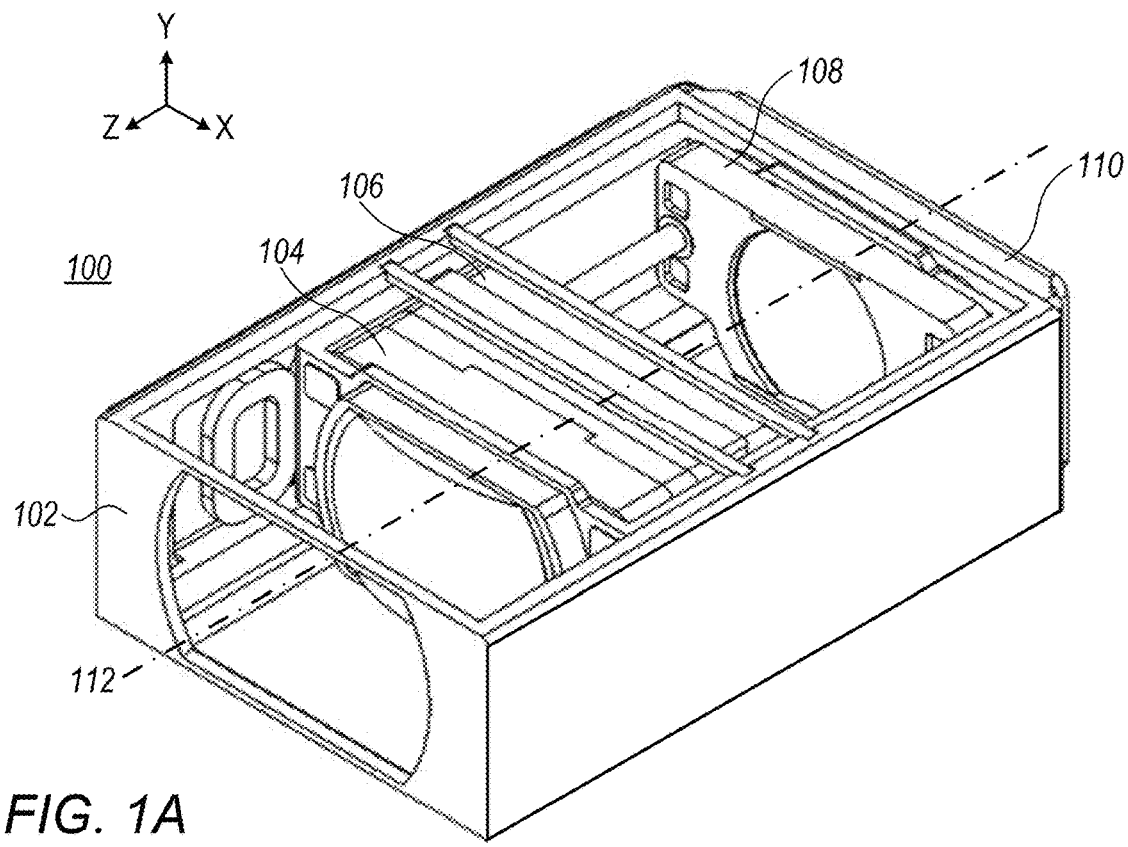
FIG. 1A shows a perspective view of an embodiment of a folded Tele lens and sensor module in a Tele lens state with focus on infinity.
Figure 1B:
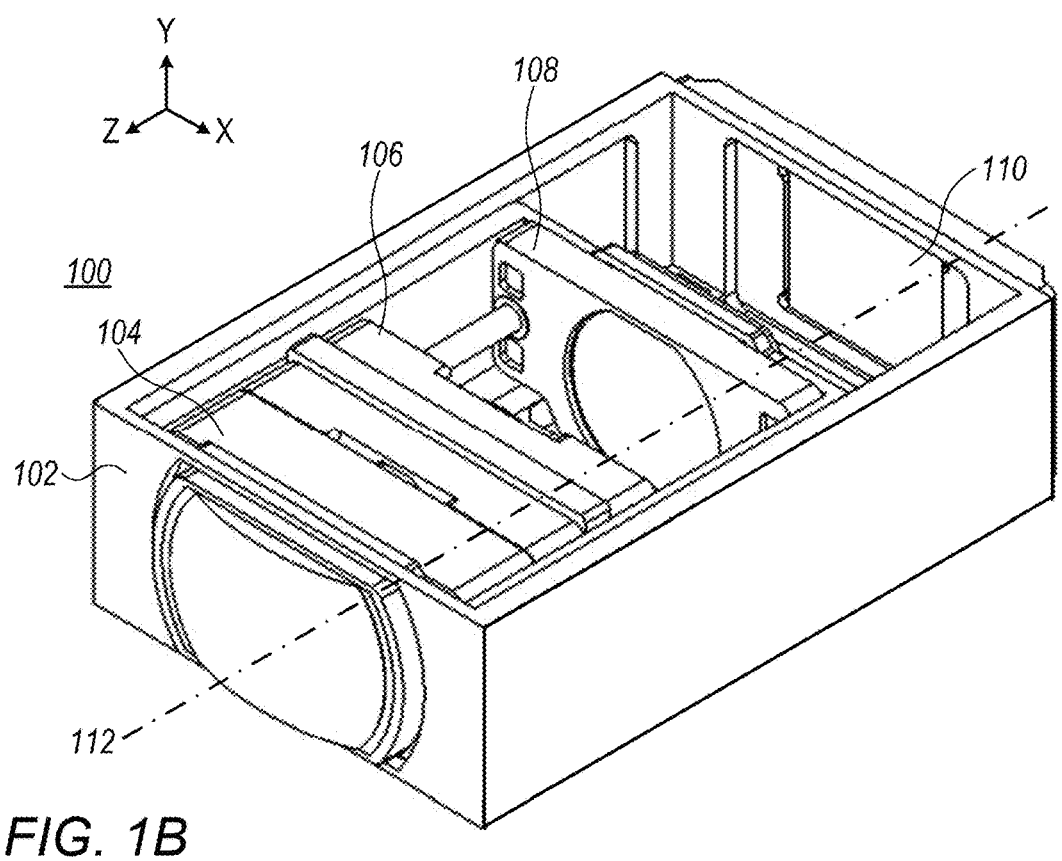
FIG. 1B shows a perspective view of the Tele lens and sensor module of FIG. 1A in a Macro lens state with focus on a close object.

FIGS. 1A and 1B show schematically an embodiment of a folded Tele lens and sensor module disclosed herein and numbered 100. FIG. 1A shows module 100 in a Tele lens state with focus on infinity from a top perspective view, and FIG. 1B shows module 100 in a Macro lens state with maximum object-to-image magnification ($M_{max}$) with a focus on a (close) object at about 4 cm from the camera from the same top perspective view.

Module 100 further comprises a first lens group (G1) 104, a second lens group (G2) 106 and a third lens group (G3) 108, a module housing 102 and an image sensor 110. In this embodiment, lens groups 104, 106 and 108 are fixedly coupled, i.e. the distances between lens groups do not change. Lens groups 104, 106 and 108 together may form a lens with an EFL=13 mm. Lens groups 104, 106 and 108 share a lens optical axis 112. For focusing, lens groups 104, 106 and 108 are actuated together by a VCM mechanism (not shown) along lens optical axis 112. A VCM mechanism (not shown) can also be used for changing between lens focus states.

With reference to FIG. 1B and to an optical design detailed in Example 6 in Table 25 of PCT/IB2020/051405, $M_{max}$=2.3:1 may be achieved (for objects at 4.2 cm). This according to a thin lens approximation with EFL=13 mm, a lens-image distance v=19 mm, and an object-lens distance of u=42 mm. $M_{max}$ may be achieved with the lens configuration as shown in FIG. 1B, where lens groups G1+G2+G3 are moved together as far as possible towards the object (i.e. away from sensor 110).

A smaller object-to-image magnification M may be selected continuously by capturing the object from a larger distance. A magnification of zero (for objects at infinity) is obtained with the lens configuration of FIG. 1A and with lens groups G1+G2+G3 moved together as far as possible towards image sensor 110. For magnifications between zero and $M_{max}$, lens groups G1+G2+G3 are moved together between the limits stated above. For example, a magnification M=4.3:1 may be desired. To switch from a $M_{max}$ state to M=4.3:1, the lenses G1+G2+G3 must be moved together about 3 mm towards the image sensor.

In another embodiment a Macro camera may have an EFL of 25 mm and may be compared to a UW camera with EFL=2.5 mm described above. Both cameras may include a same image sensor, e.g., with 4 mm active image sensor width. When focused to 5 cm, the Macro camera with EFL=25 mm will have 1:1 object-to-image magnification and will capture an object width of 4 mm (same as the sensor width). In comparison, the UW camera with approximately 19:1 object-to-image magnification will capture an object width of 76 mm.

A Tele camera with an EFL=7-40 mm may be beneficial for Macro photography, as it can provide large image magnification. However, focusing a Tele camera to short object-lens distances is not trivial and requires large lens strokes that must support optics specifications such as limiting de-center deviations (with respect to a plane normal to an optical path) between lens and image sensor to 25 μm or less, e.g. to 5 μm. As an example, for focusing the Macro camera having EFL=25 mm to 10 cm (compared to focus on infinity), a lens stroke of about 6.3 mm is required. For an upright (non-folded) Tele camera, lens strokes of 2 mm or more are incompatible with mobile device (and thus camera) height constraints. However, in folded camera designs (described in FIGS. 1A-1B and FIGS. 2A-2B) or "pop-out" camera designs (described in FIGS. 1J-1K and for example in co-owned international patent application PCT/IB2020/058697) a smartphone's height does not limit such lens strokes.

In other embodiments, a folded or non-folded Tele camera for capturing Macro images may have an EFL of 7-40 mm, for example 18 mm. For Macro capability, the folded or non-folded Tele camera may be able to focus continuously to objects having an object-lens distance of e.g. 30-350 mm.

Figure 1C:
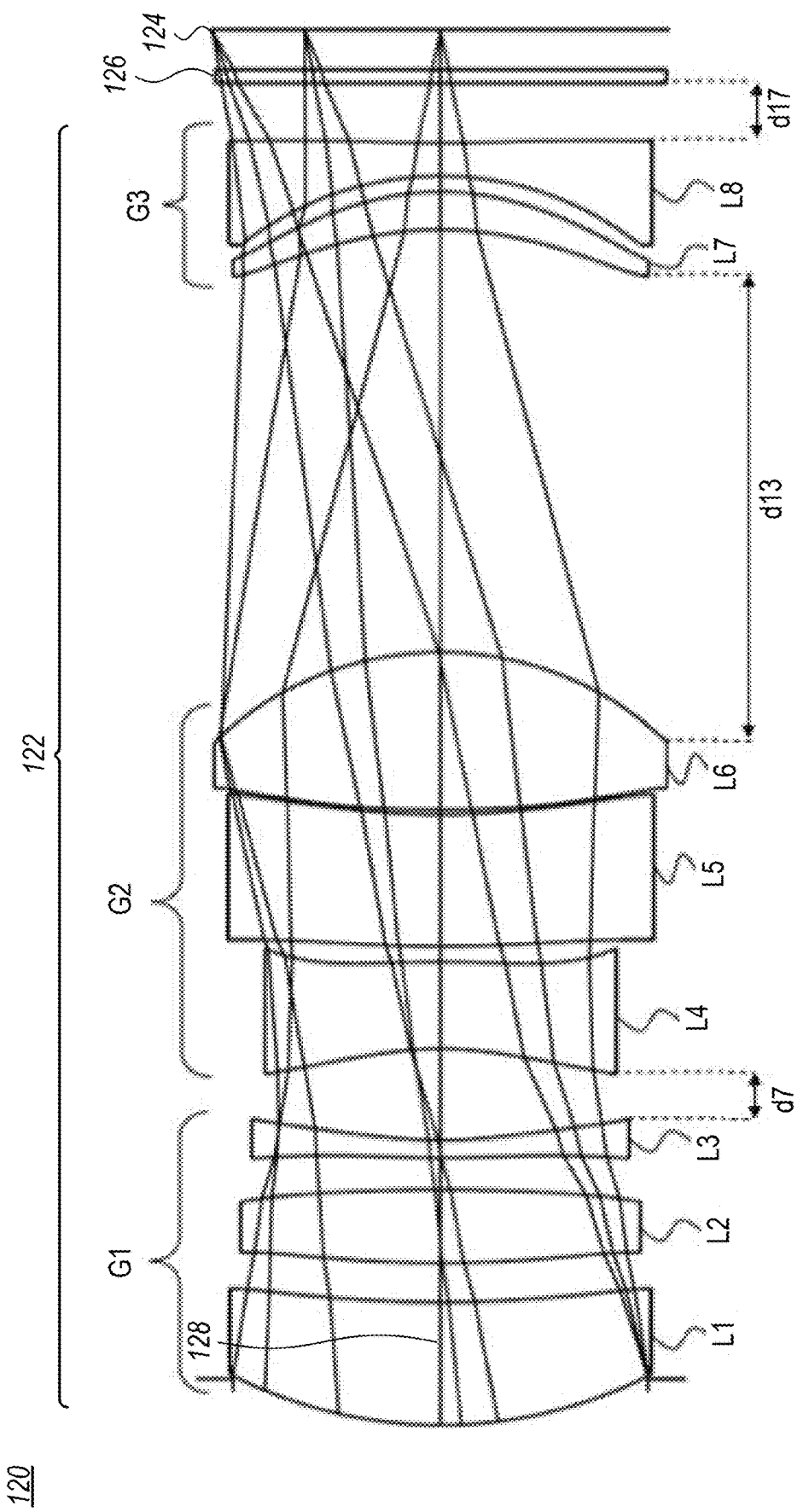
FIG. 1C shows in cross section another continuous zoom Tele lens and sensor module disclosed herein in a minimum zoom state.
Figure 1D:
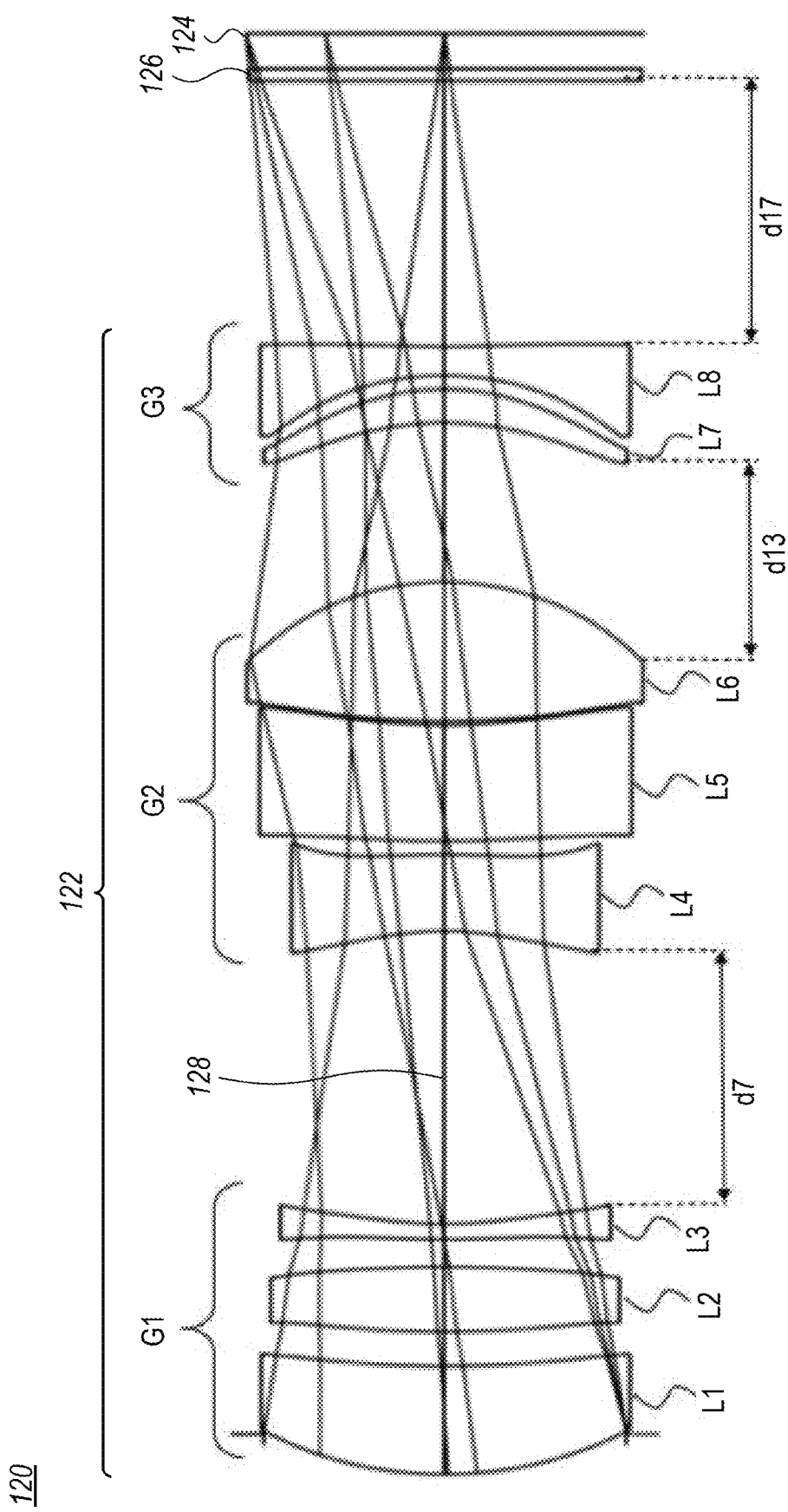
FIG. 1D shows the module of FIG. 1C in an intermediate zoom state.
Figure 1E:
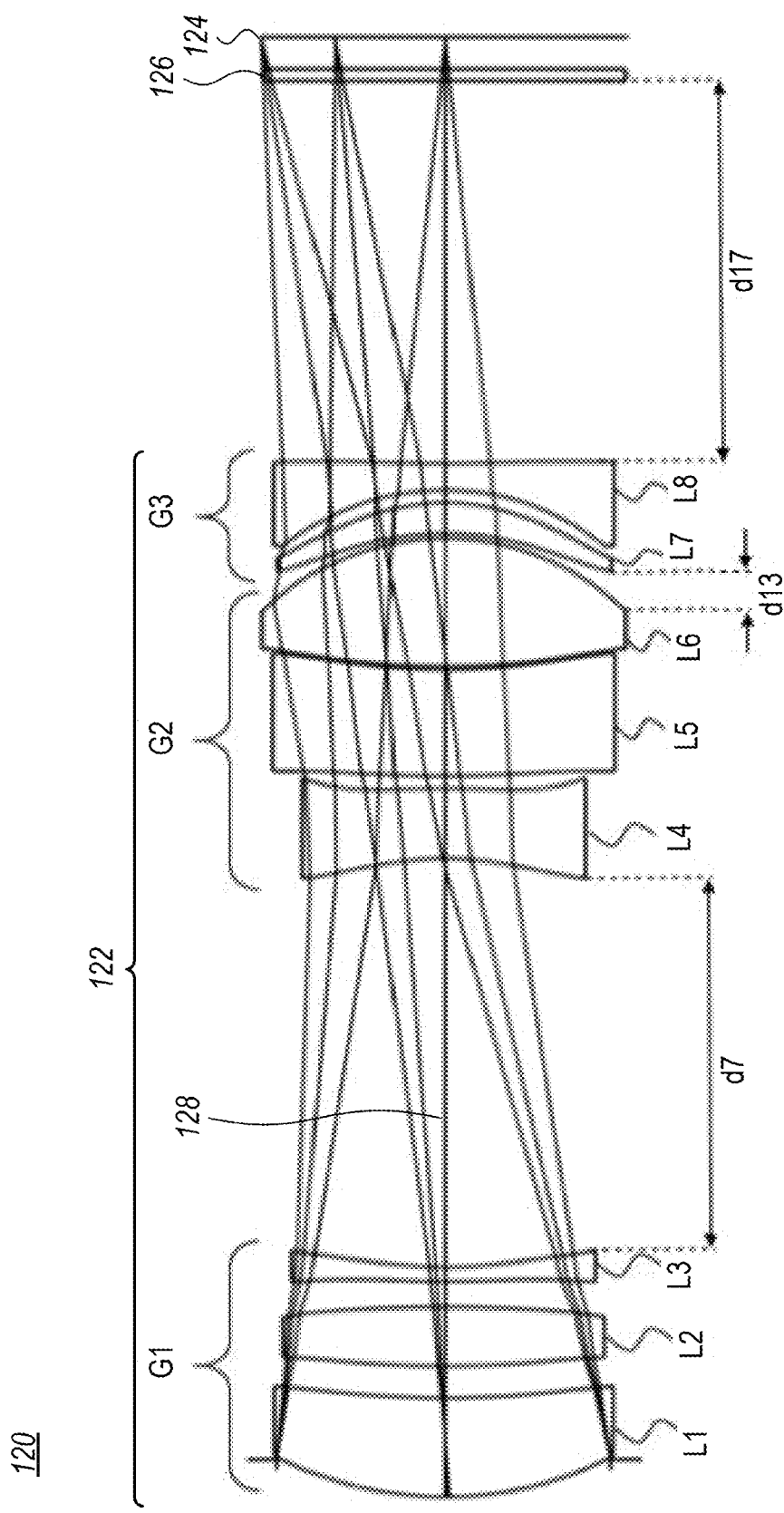
FIG. 1E shows the module of FIG. of FIG. 1C in a maximum zoom state.

FIG. 1C-E shows an embodiment of a continuous zoom Tele lens and sensor module disclosed herein and numbered 120 in different zoom states. FIG. 1C shows module 120 in its minimum zoom state, having an EFL=15 mm, FIG. 1D shows module 120 in an intermediate zoom state, having an EFL=22.5 mm, and FIG. 1E shows module 120 in its maximum zoom state, having an EFL=30 mm.

Module 120 comprises a lens 122 with 8 single lens elements L1-L8, an image sensor 124 and, optionally, an optical window 126. The optical axis is indicated by 128. Module 120 is included in a folded Tele camera such as camera 1000. Module 120 has a continuous zoom range that can be switched continuously between a minimum zoom state and a maximum zoom state. The EFL of the maximum zoom state EFL$_{MAX}$ and the EFL of the minimum zoom state EFL$_{MIN}$ fulfil EFL$_{MAX}$=2×EFL$_{MIN}$. Lens 122 is divided into three lens groups, group 1 ("G1"), which is closest to an object, group 2 ("G2") and group 3 ("G3"), which is closest to sensor 124. For changing a zoom state, G1 and G3 are moved together as one group ("G13" group) with respect to G2 and to sensor 124. For focusing, G1+G2+G3 move together as one group with respect to sensor 124.

Figure 1F:
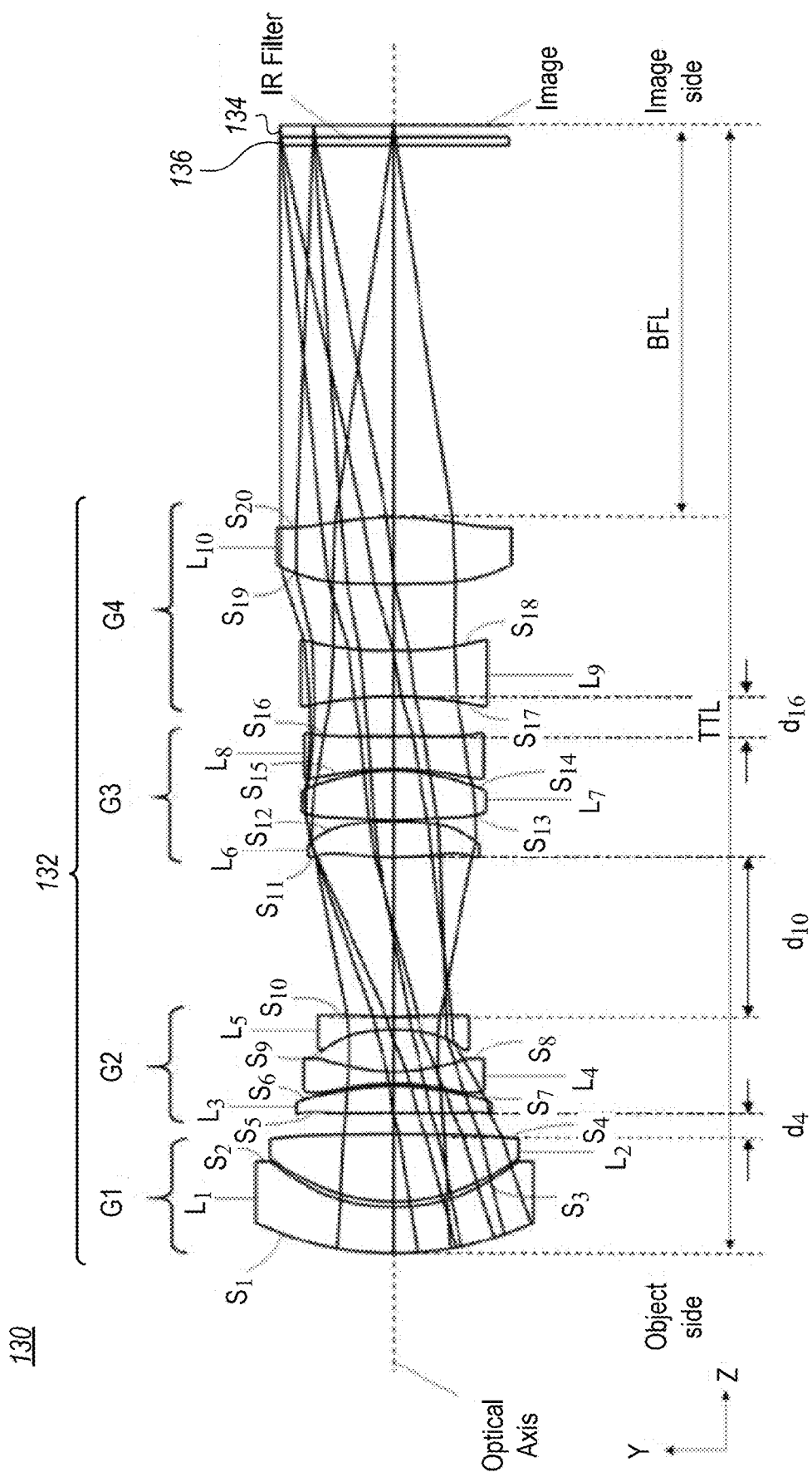
FIG. 1F shows in cross section yet another continuous zoom Tele lens and sensor module disclosed herein in a minimum zoom state.
Figure 1G:
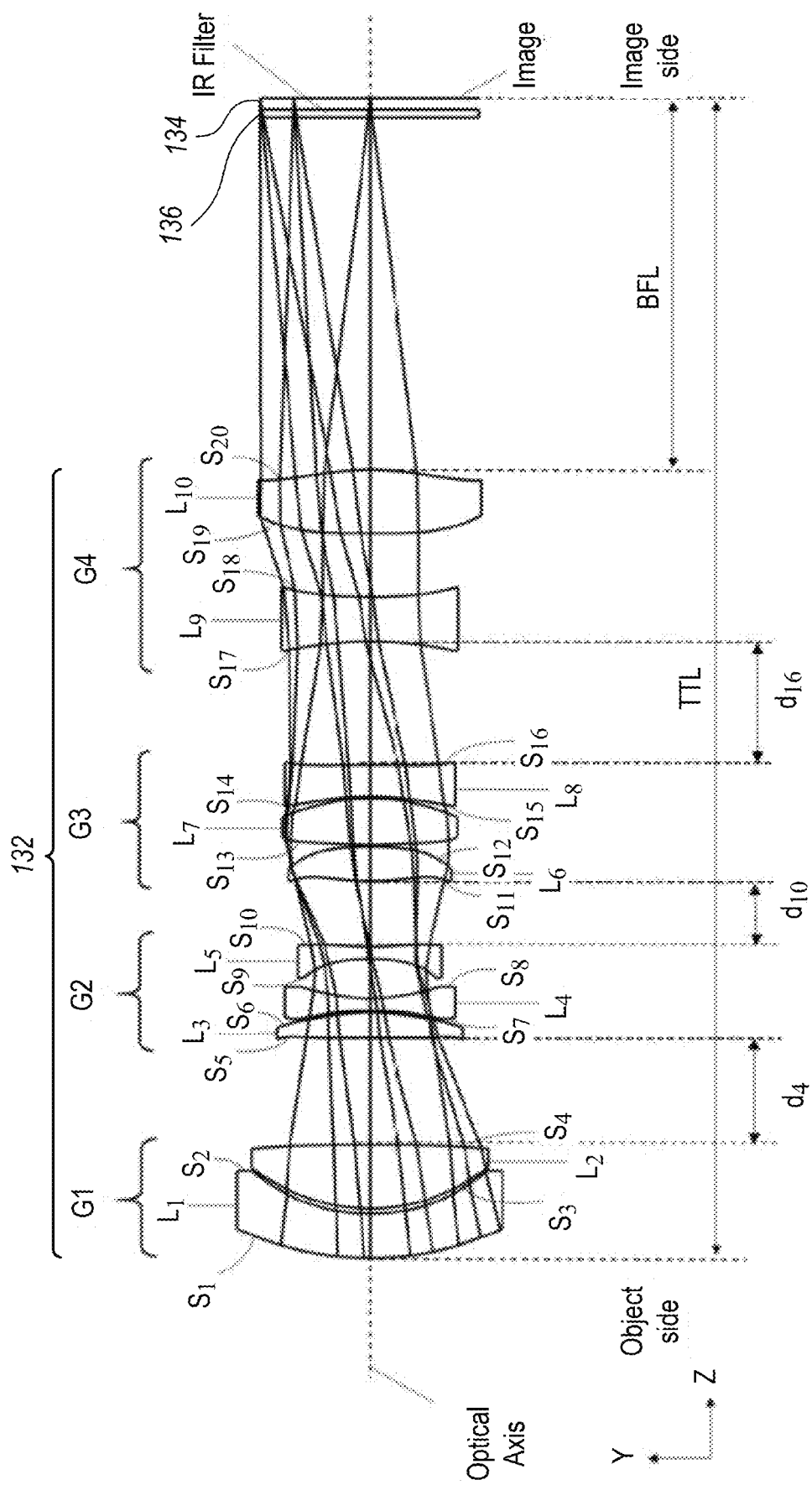
FIG. 1G shows the module of FIG. 1F in an intermediate zoom state.
Figure 1H:
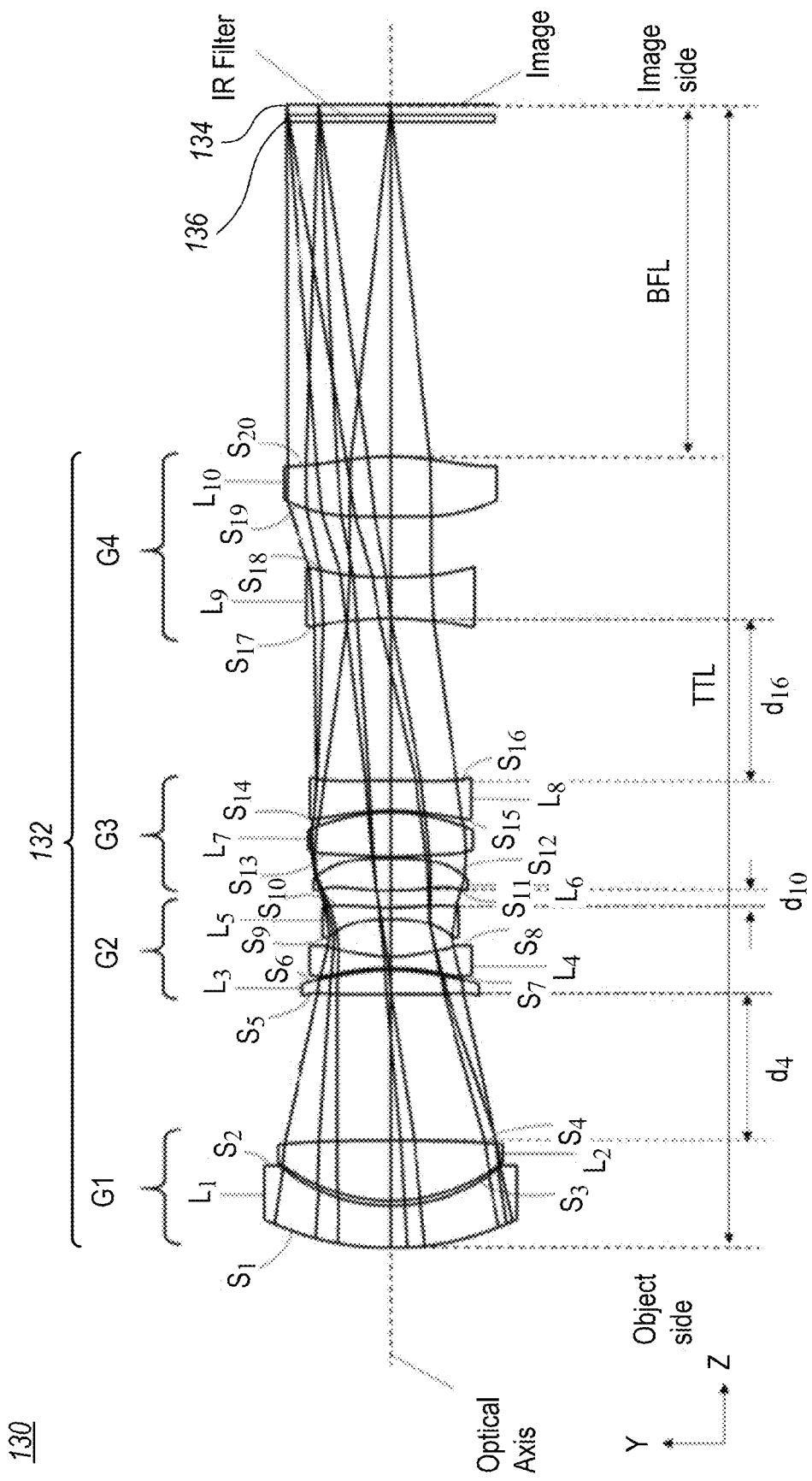
FIG. 1H shows the module of FIG. of FIG. 1F in a maximum zoom state.
Figure 1I:
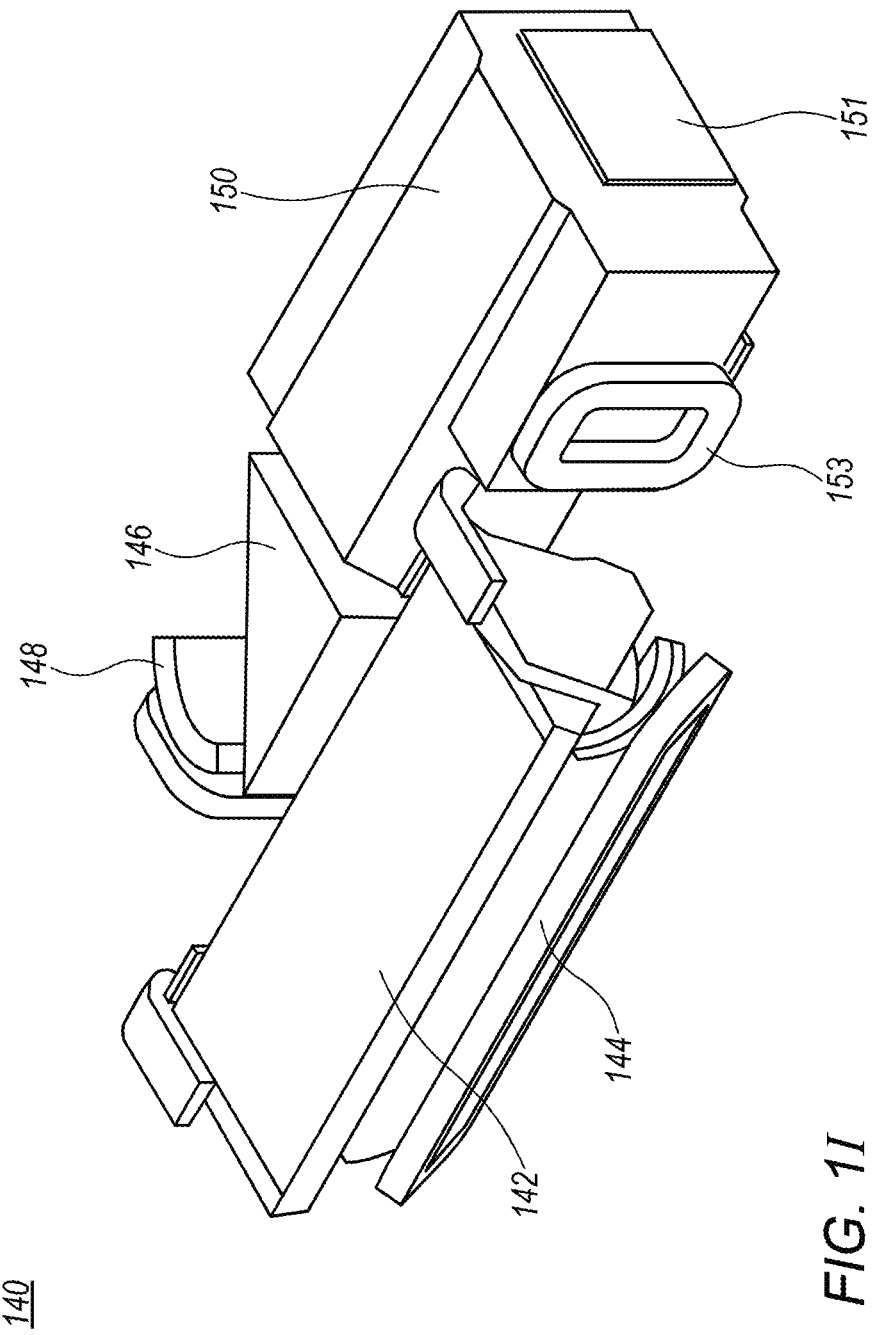
FIG. 1I shows an embodiment of a folded Tele camera disclosed herein.

FIG. 1F-H shows another embodiment of a continuous zoom Tele lens and sensor module disclosed herein and numbered 130 in different zoom states. FIG. 1F shows module 130 in its minimum zoom state, having an EFL=10 mm, FIG. 1G shows module 130 in an intermediate zoom state, having an EFL=20 mm, and FIG. 1H shows module 130 in its maximum zoom state, having an EFL=30 mm.

Module 130 comprises a lens 132 with 10 single lens elements L1-L10, an image sensor 134 and optionally an optical window 136. Module 130 is included in a folded Tele camera such as camera 1000. Module 130 has a continuous zoom range that can be switched continuously between a minimum zoom state and a maximum zoom state. The EFL of the maximum zoom state EFL$_{MAX}$ and the EFL of the minimum zoom state EFL$_{MIN}$ fulfil: EFL$_{MAX}$=3× EFL$_{MIN}$. Lens 132 is divided into four lens groups, group 1 ("G1"), which is closest to an object, group 2 ("G2"), group 3 ("G3") and group 4 ("G4") which is closest to sensor 134. For changing a zoom state, G1 and G3 are moved together as one group ("G13" group) with respect to G2, G4 and to sensor 134. For focusing, G13+G2+G4 move together as one group with respect to sensor 134.

Figure 1J:
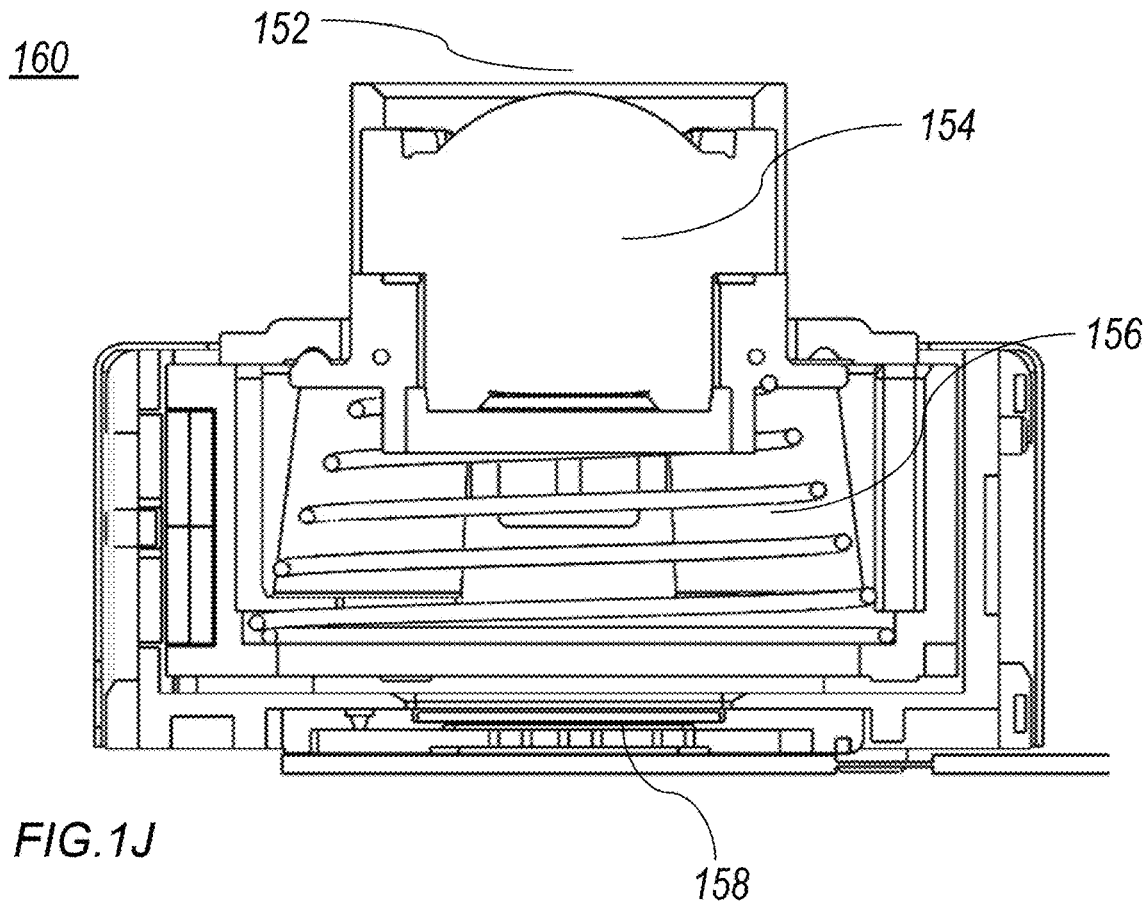
FIG. 1J shows a pop-out camera in an operational or "pop-out" state.
Figure 1K:
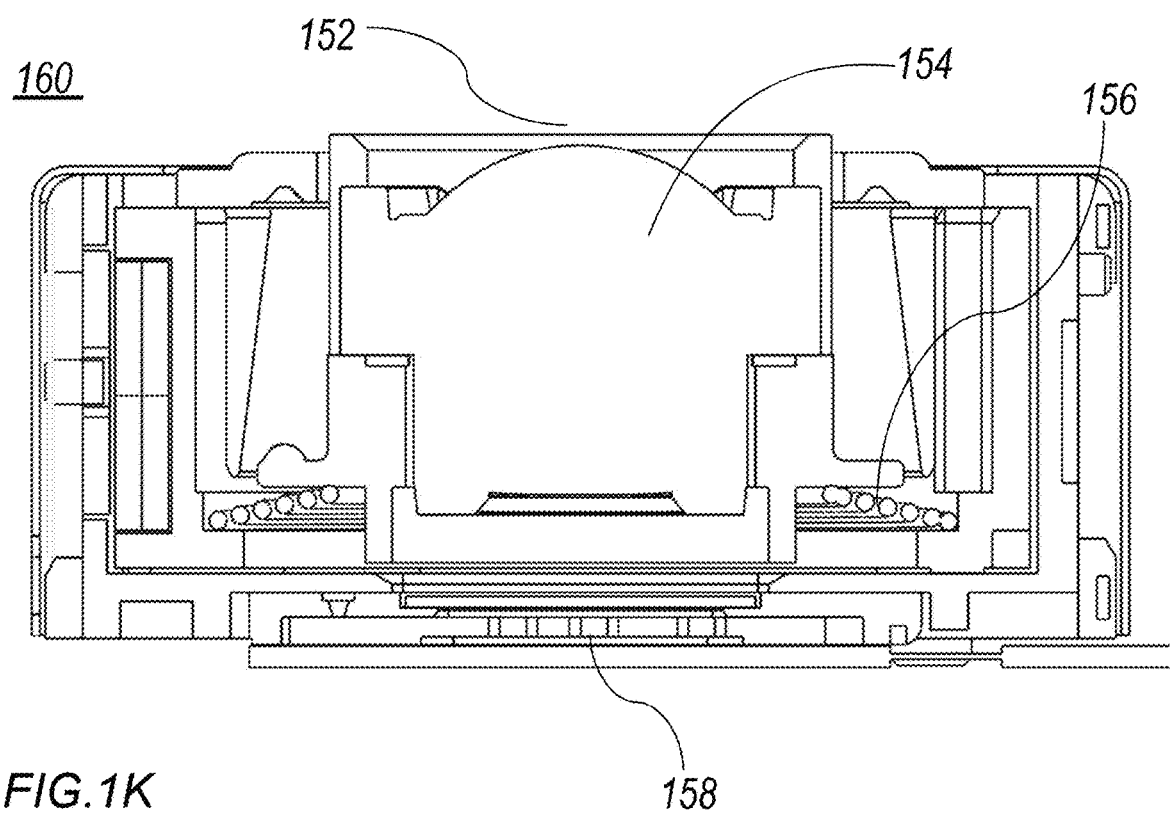
FIG. 1K shows the pop-out camera of FIG. 1J in a non-operational or "collapsed" state.
Figure 1L:
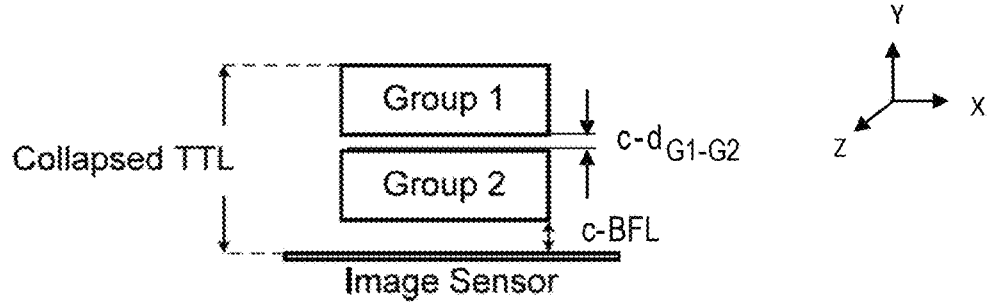
FIG. 1L shows an exemplary Tele-Macro camera lens system disclosed herein in a cross-sectional view in a collapsed state.

FIG. 1*l* shows an embodiment of a folded Tele camera disclosed herein and numbered 140. In general, folded Tele cameras are based on one optical path folding element (OPFE). Such scanning folded Tele cameras are described for example in the co-owned international patent application PCT/IB2016/057366. Camera 140 is based on two OPFEs, so that one may refer to a "double-folded" Tele camera. Module 140 comprises a first "Object OPFE" 142, an Object OPFE actuator 144, an "Image OPFE" 146 and an Image OPFE actuator 148. A lens (not shown) is included in a lens barrel 150. Camera 140 further includes an image sensor 151 and a focusing actuator 153.

Module 140 is a scanning folded Tele camera. By rotational movement of Object OPFE 142 and Image OPFE 146, the native (diagonal) FOV (FOVN) of camera 140 can be steered for scanning a scene. FOVN may be 10-40 degrees, and a scanning range of FOVN may be ±5 deg-±35 deg. For example, a scanning folded Tele camera with 20 deg FOVN and ±20 FOVN scanning covers a Tele FOV of 60 deg.

FIG. 1J-K shows exemplarily a pop-out Tele camera 160 which is described for example in co-owned international patent application PCT/IB2020/058697. FIG. 1J shows pop-out camera 160 in an operational or "pop-out" state. Pop-out camera 150 comprises an aperture 152, a lens barrel 154 including a lens (not shown), a pop-out mechanism 156 and an image sensor 158. FIG. 1K shows pop-out camera 160 in a non-operational or "collapsed" state. By means of pop-out mechanism 156, camera 150 is switched from a pop-out state to the collapsed state. In some dual-camera embodiments, both the W camera and the T camera may be pop-out cameras. In other embodiments, only one of the W or T cameras may be a pop-out camera, while the other (non-pop-out) camera may be a folded or a non-folded (upright) camera.

Figure 1M:
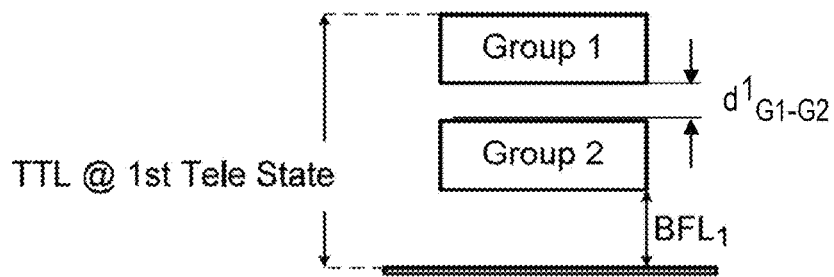
FIG. 1M shows the lens system of FIG. 1L in a first Tele state having a first EFL and a first zoom factor.
Figure 1N:
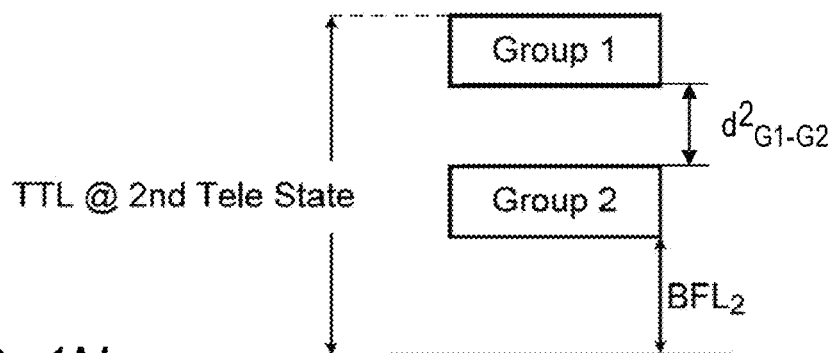
FIG. 1N shows the lens system of FIG. 1L in a second Tele state having a second EFL and a second zoom factor.
Figure 1O:
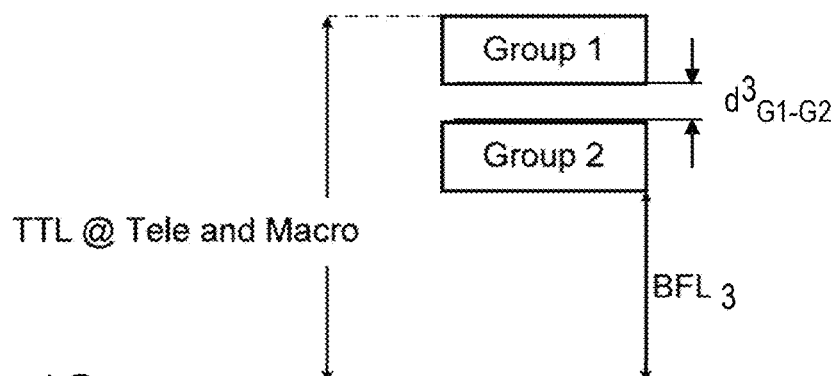
FIG. 1O shows the lens system of FIG. 1L in a Tele-Macro state having a third EFL and a third zoom factor.

FIGS. 1L-O show schematically an exemplary pop-out Tele-Macro camera lens system 170 as disclosed herein in a cross-sectional view. Lens system 170 may be included in a pop-out camera as described in FIGS. 1J-K. FIG. 1L shows lens system 170 in a collapsed state. FIG. 1M shows lens system 170 in a first Tele state having a first EFL (EFL1) and a first zoom factor (ZF1). FIG. 1N shows lens system 170 in a second Tele state having a second EFL (EFL2) and a second ZF2, wherein EFL1<EFL2 and ZF1<ZF2. FIG. 1O shows lens system 170 in a Tele-Macro state having a third EFL3 and a third ZF3. In the Tele-Macro state, a camera including lens system 170 can focus to close objects at <350 mm object-lens distance for capturing Macro images.

Figure 1P:
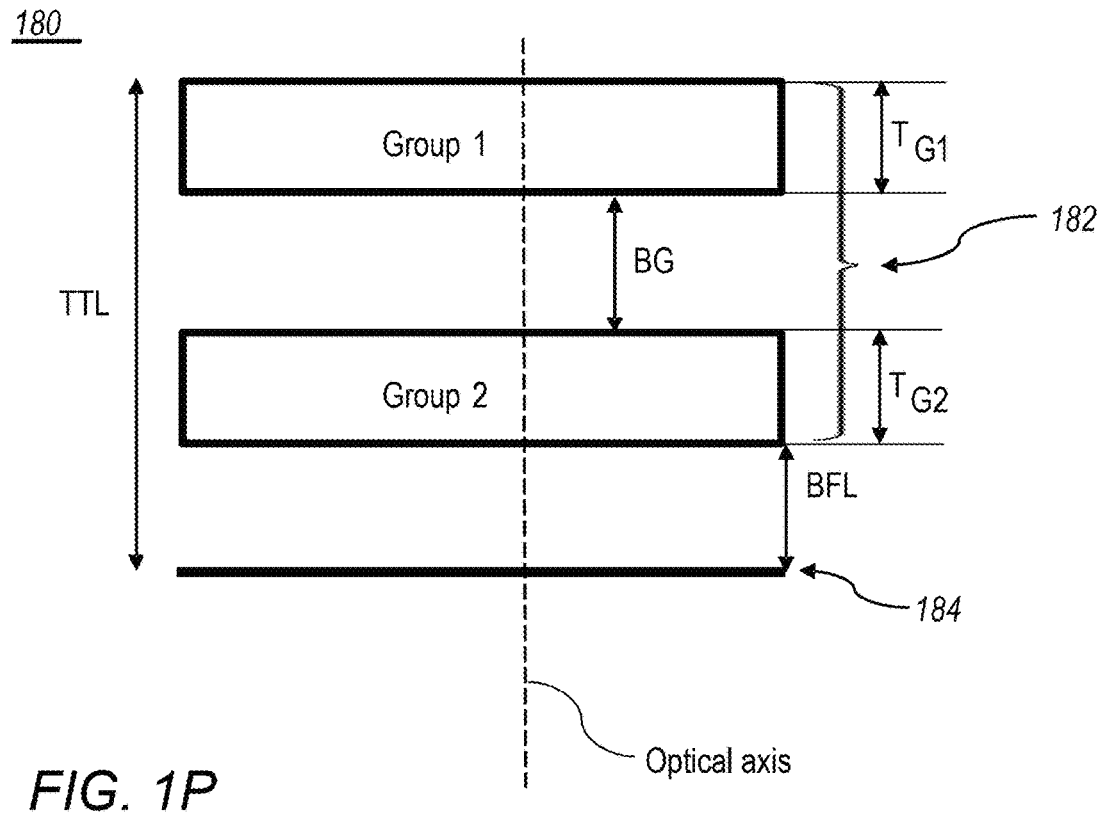
FIG. 1P shows schematically another exemplary Tele-Macro camera lens system disclosed herein in a cross-sectional view in pop-out state.
Figure 1Q:
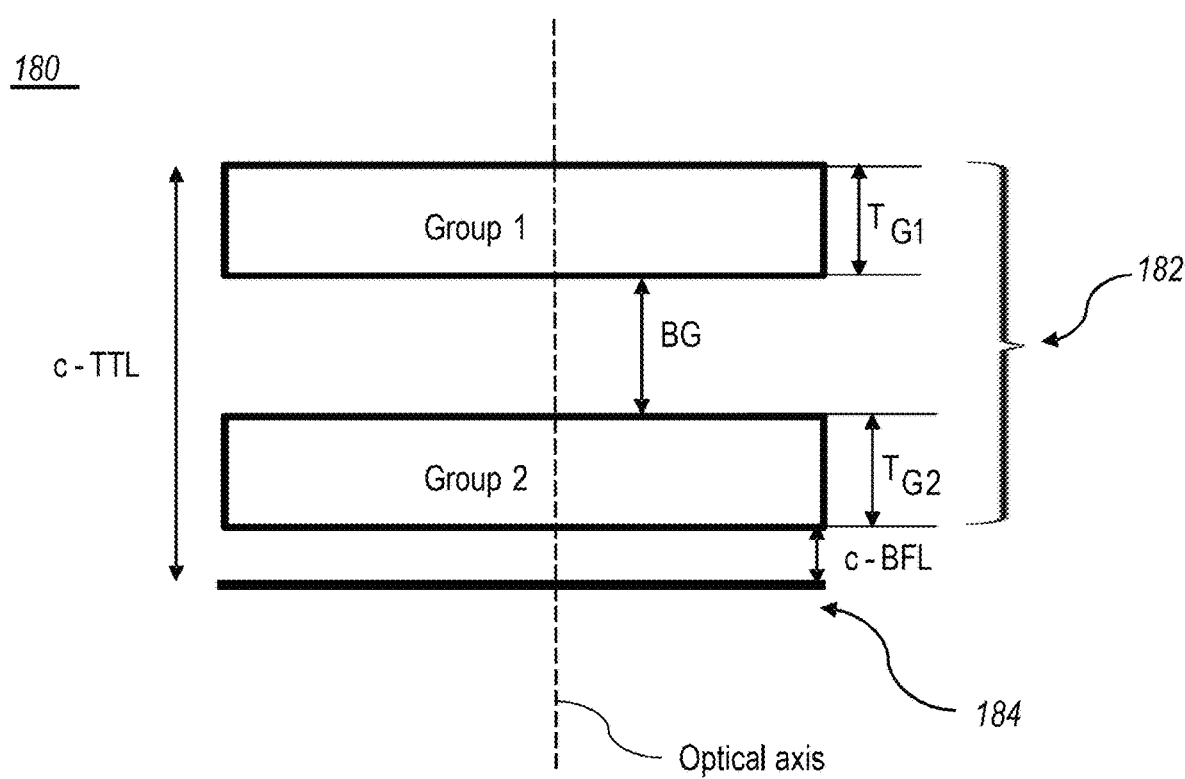
FIG. 1Q shows the lens system of FIG. 1P in a first collapsed state.
Figure 1R:
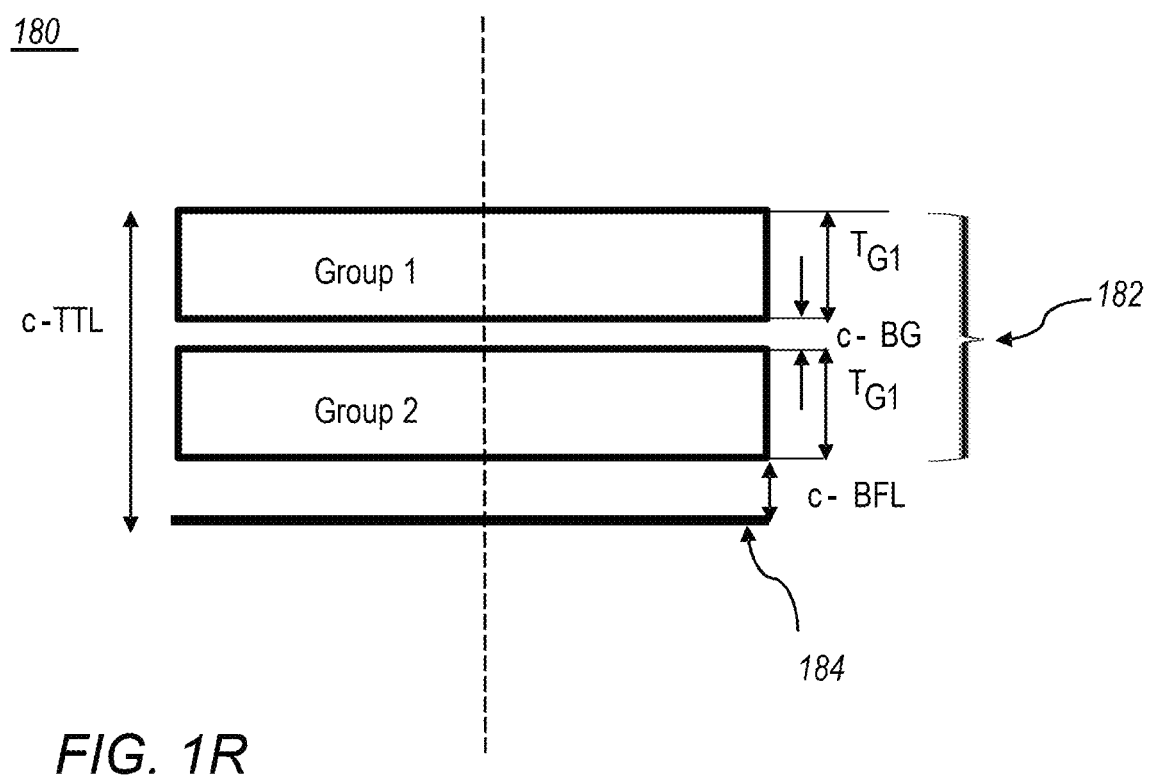
FIG. 1R shows the lens system of FIG. 1P in a second collapsed state.

FIGS. 1P-R show schematically another exemplary pop-out Tele-Macro camera lens system 180 as disclosed herein in a cross-sectional view. Lens system 180 includes a lens 182 and an image sensor 184. Lens system 180 may be included in a pop-out camera as described in FIGS. 1J-K. FIG. 1P shows lens system 180 in pop-out state. In a pop-out state, a camera including lens system 180 can focus to close objects at <350 mm object-lens distance for capturing Macro images. FIG. 1Q shows lens system 180 in a first collapsed state. FIG. 1R shows lens system 180 in a second collapsed state.

Figure 1S:
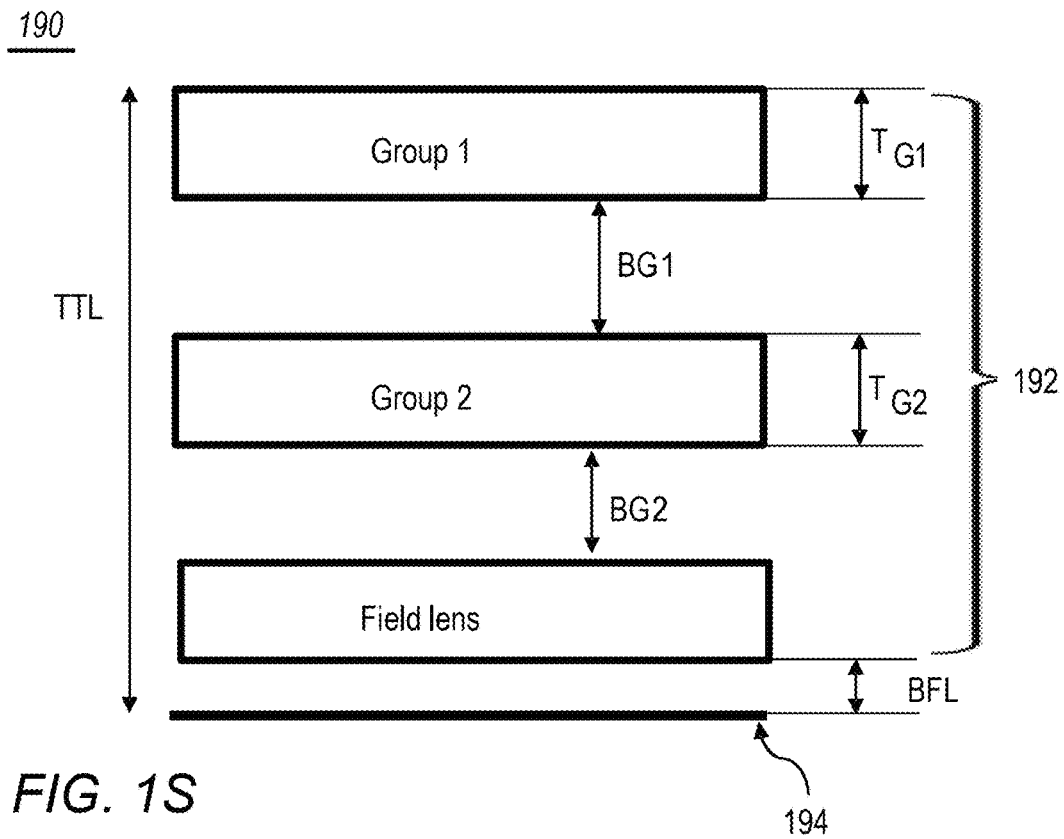
FIG. 1S shows schematically yet another exemplary Tele-Macro camera lens system disclosed herein in a cross-sectional view in pop-out state.
Figure 1T:
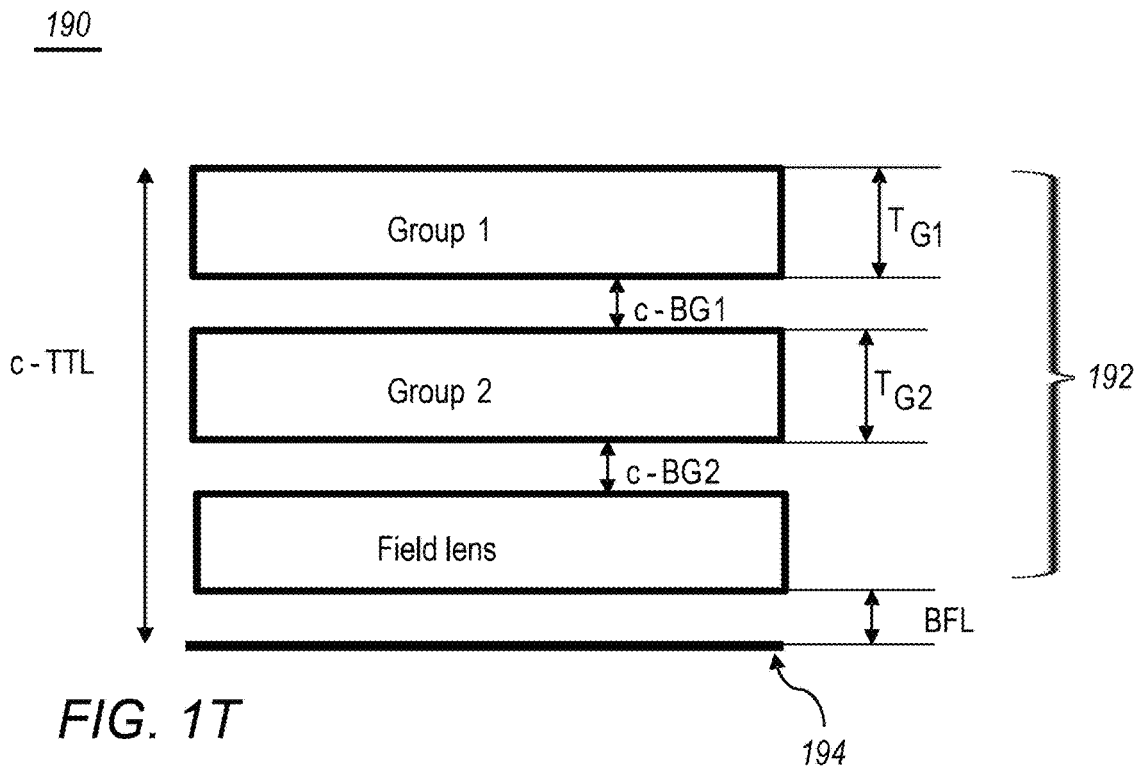
FIG. 1T shows the lens system of FIG. 1S in a collapsed state.

FIGS. 1S-T show schematically another exemplary pop-out Tele-Macro camera lens system 190 as disclosed herein in a cross-sectional view. Lens system 190 includes a lens 192 and an image sensor 194. Lens system 190 may be included in a pop-out camera as described in FIGS. 1J-K. FIG. 1S shows lens system 190 in pop-out state. In a pop-out state, a camera including lens system 190 can focus to close objects at less than 350 mm object-lens distance for capturing Macro images. FIG. 1T shows lens system 190 in a collapsed state.

Modules 100, 120, 130, 140, 150, 170, 180, 190 and 220 or cameras including modules 100, 120, 130, 140, 150, 170, 180, 190 and 220 may be able/used to capture Macro images with a Macro camera module such as Macro camera module 910.

Figure 1U:
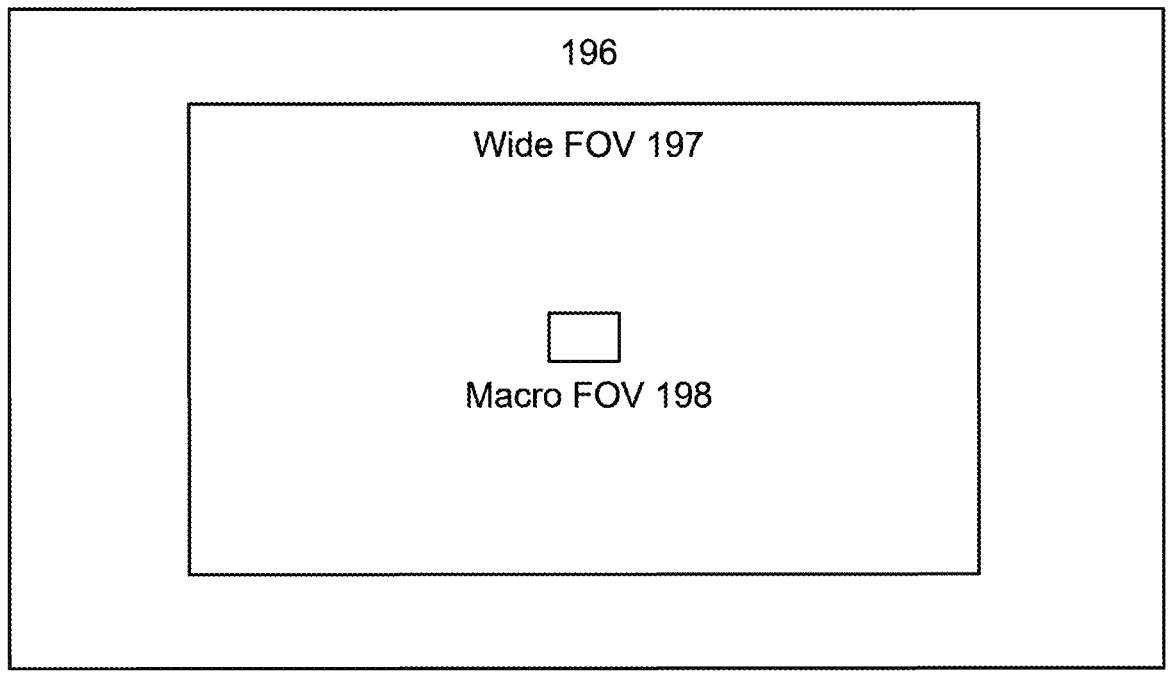
FIG. 1U shows schematically dual-camera output image sizes and ratios between an ultra-wide FOV and a Macro FOV.

FIG. 1U illustrates in an example 195 exemplary triple camera output image sizes of, and ratios between an Ultra-Wide (UW) FOV 196, a Wide (W) FOV 197 and a Macro FOV 198. With respect to a Tele camera used for capturing objects at lens-object distances of e.g. 1 m or more, in a Macro mode based on a Tele camera, a larger image is formed at the image sensor plane. Thus an image may cover an area larger than the active area of an image sensor so that only a cropped FOV of the Tele camera's FOV may be usable for capturing Macro images. As an example, consider a Macro camera that may have an EFL of 30 mm and an image sensor with 4 mm active image sensor width. When focused to an object at 5 cm (lens-object distance) a lens-image distance of v=77 mm is required for focusing and an object-to-image magnification of about 1:1.5 is achieved. A Macro FOV of about 43% of the actual Tele FOV may be usable for capturing Macro images.

The following description refers to W cameras, assuming that a UW camera could be used instead.

Figure 2A:
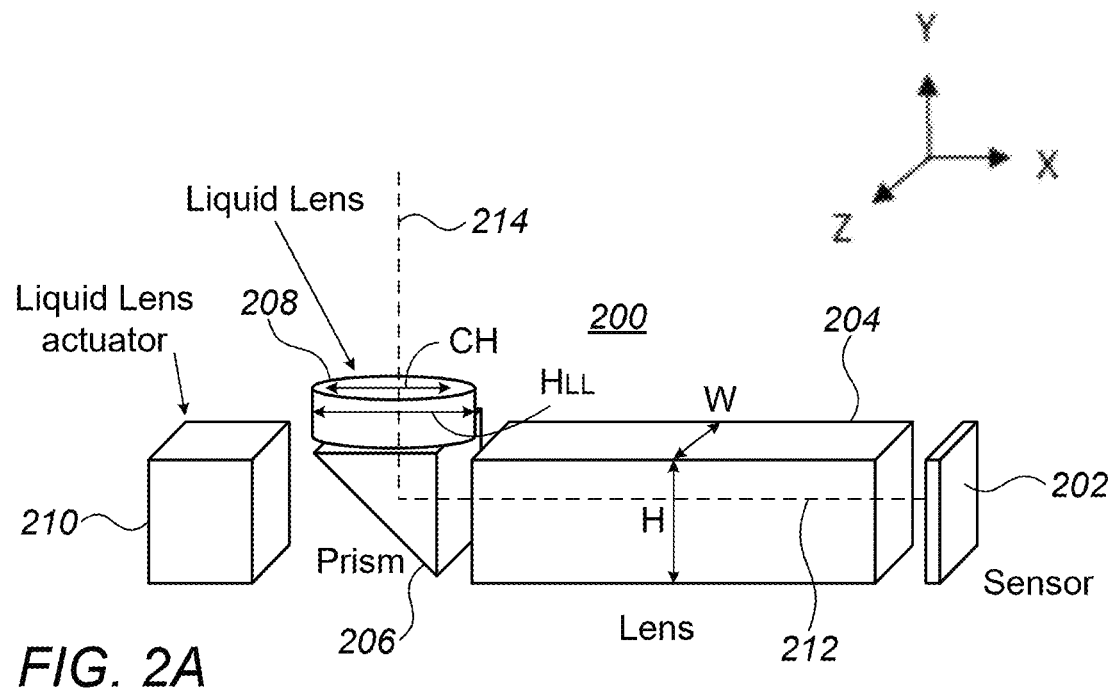
FIG. 2A illustrates an embodiment of a folded Tele digital camera with Macro capabilities disclosed herein.

FIG. 2A illustrates an embodiment of a folded Tele camera with Macro capabilities disclosed herein, numbered 200. Camera 200 comprises an image sensor 202, a lens 204 with an optical axis 212, and an OPFE 206, exemplarily a prism. Camera 200 further comprises a liquid lens (LL) 208 mounted on a top side (surface facing an object, which is not shown) of prism 206, in a direction 214 perpendicular to optical axis 212. The liquid lens has optical properties that can be adjusted by electrical voltage supplied by a LL actuator 210. In this embodiment, LL 208 may supply a dioptre range of 0 to 35 dioptre continuously. In a Macro photography state, the entire lens system comprising LL 208 and lens 204 may have an EFL of 7-40 mm. The DOF may be as shallow as 0.01-2 mm. In this and following embodiments, the liquid lens has a mechanical height Hu and an optical height (clear height) CH. CH defines a respective height of a clear aperture (CA), where CA defines the area of the lens surface that meets optical specifications. That is, CA is the effective optical area and CH is the effective height of the lens, see e.g. co-owned international patent application PCT/IB2018/050988.

For regular lenses with fixed optical properties (in contrast with a LL with adaptive optical properties), the ratio between the clear height and a lens mechanical height H (CH/H) is typically 0.9 or more. For a liquid lens, the CH/H ratio is typically 0.9 or less, e.g. 0.8 or 0.75. Because of this and in order to exploit the CH of the optical system comprising the prism and lens, Hu may be designed to be 15% larger or 20% larger than the smallest side of the prism top surface. In embodiment 200, LL actuator 210 is located along optical axis 212 of the lens, i.e. in the –X direction in the X-Y-Z coordinate system shown. Lens 204 may be a D cut lens with a lens width W that is larger than lens height H. In an example, a width/height W/H ratio of a D cut lens may be 1.2.

Figure 2B:
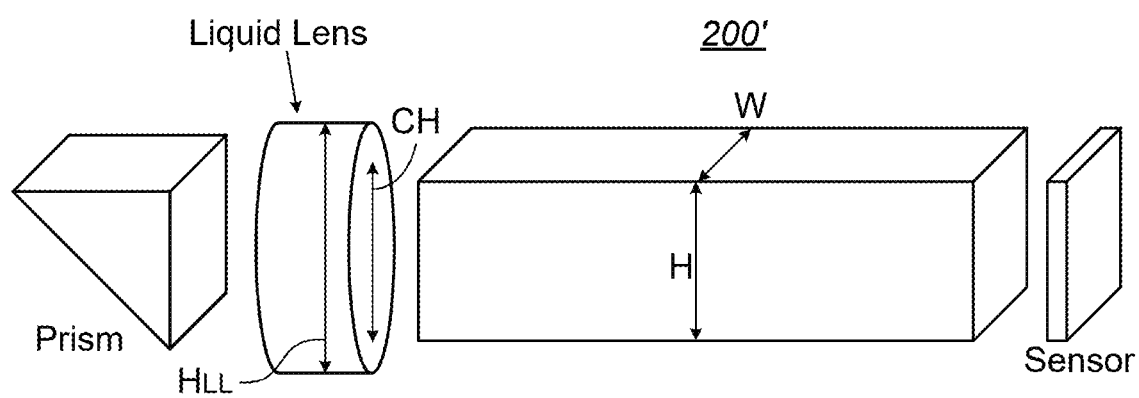
FIG. 2B illustrates another embodiment of a folded Tele digital camera with Macro capabilities disclosed herein.

FIG. 2B illustrates yet another embodiment of a folded Tele camera with Macro capabilities disclosed herein, numbered 200'. Camera 200' comprises the same elements as cameras 200, except that in in camera 200' LL 208 is located between prism 206 and lens 204. As in camera 200, lens 204 may be a D cut lens with a lens width W that is larger than a lens height H. In an example, a width/height W/H ratio of a D cut lens may be 1.2. As in camera 200, in a Macro photography state, the entire lens system comprising of LL 208 and lens 204 may have an EFL of 7 mm-40 mm and a DOF may be as shallow as 0.01-7.5 mm.

Figure 2C:
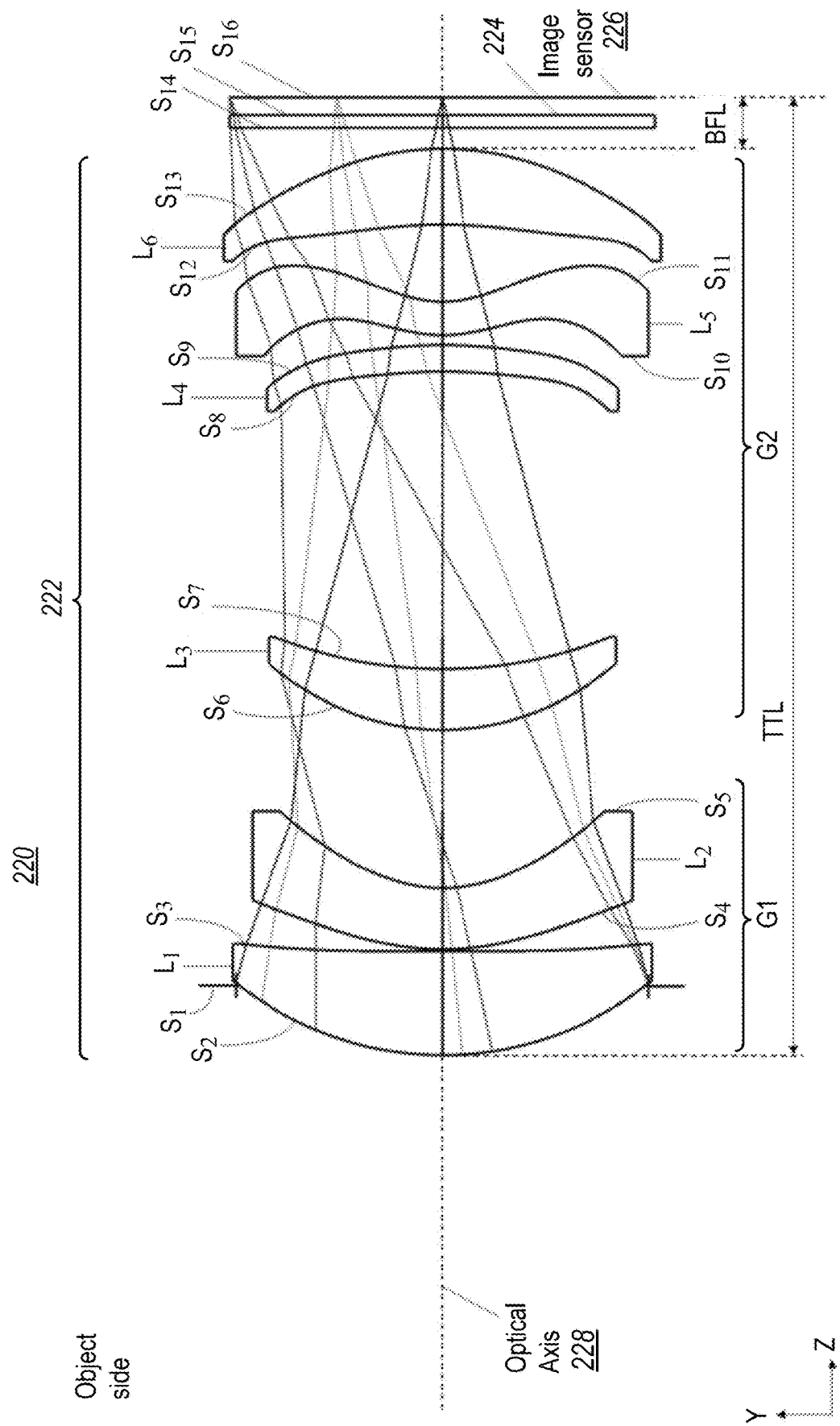
FIG. 2C shows in cross section yet another continuous zoom Tele lens and sensor module disclosed herein in a first zoom state.
Figure 2D:
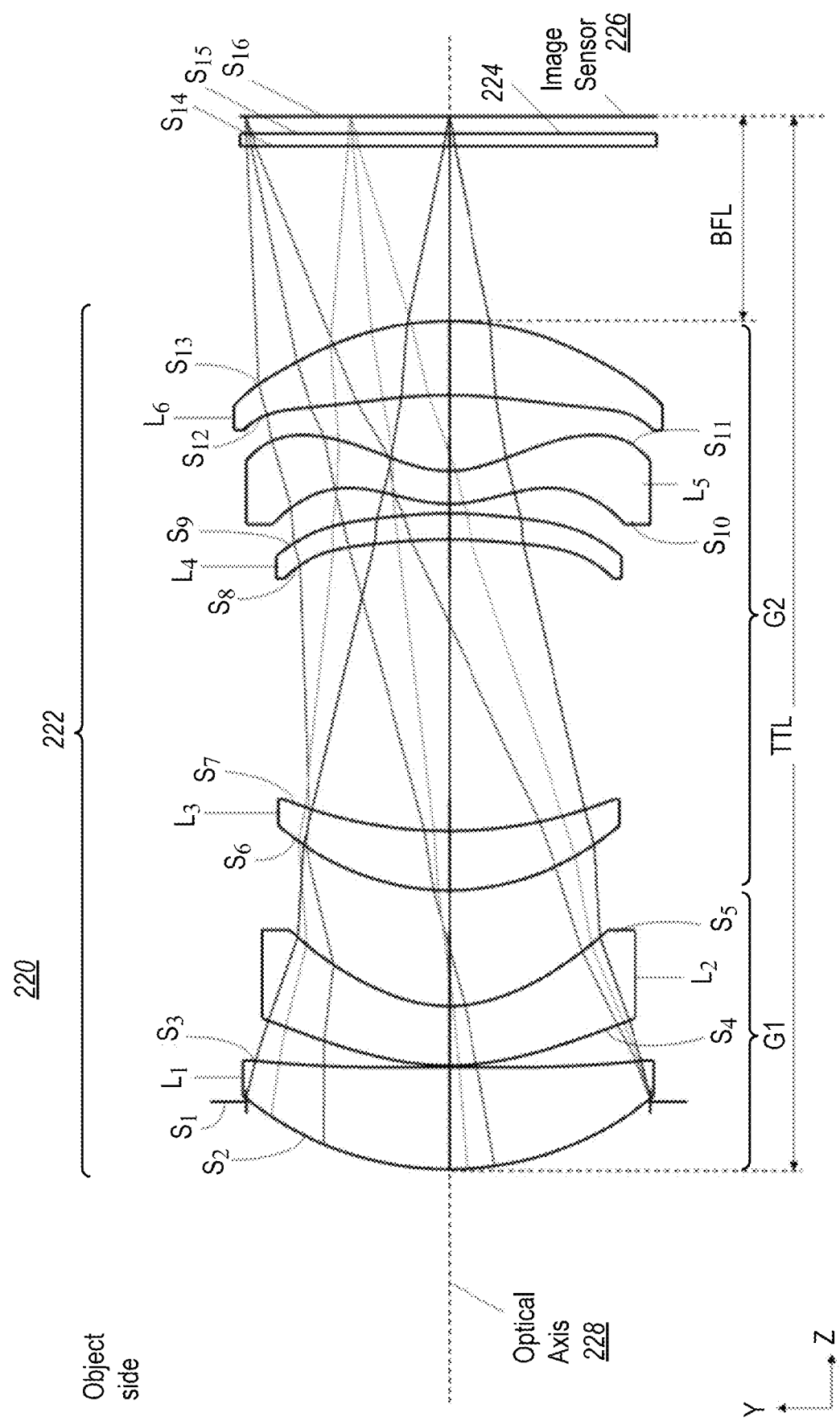
FIG. 2D shows the module of FIG. 2C in a second zoom state.
Figure 2E:
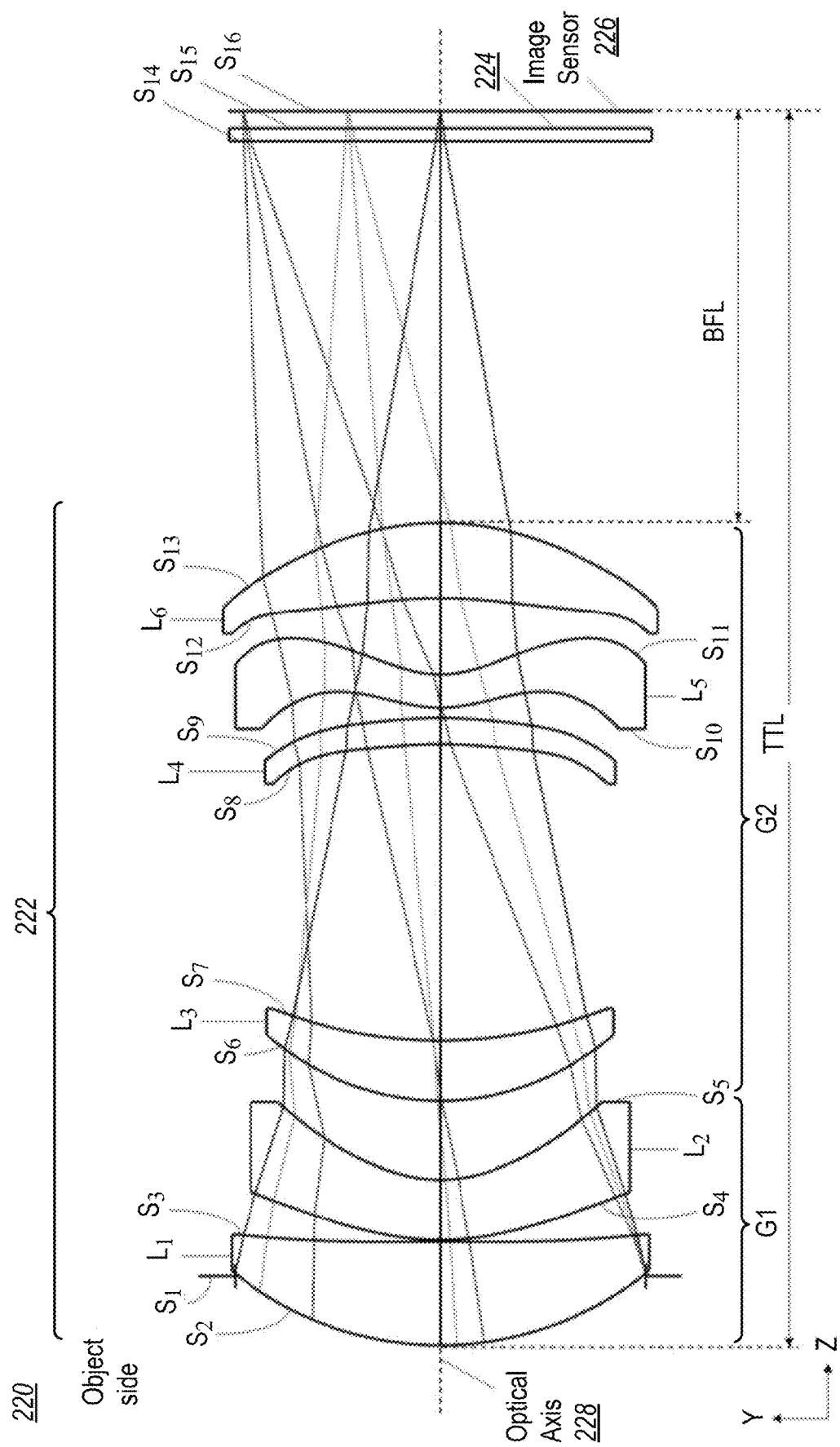
FIG. 2E shows the module of FIG. 2C in a third zoom state.

FIGS. 2C-2E show schematically another embodiment of a continuous zoom Tele lens and sensor module disclosed herein and numbered 220 in different zoom states. Module 220 is included in a folded Tele camera such as camera 1000. Module 220 comprises a lens 222, an (optional) optical element 224 and an image sensor 226. FIGS. 2C-2E show 3 fields with 3 rays for each: the upper marginal-ray, the lower marginal-ray and the chief-ray. Lens 222 includes 6 single lens elements L1-L6. The optical axis is indicated by 228.

FIG. 2C shows module 220 focused to infinity, FIG. 2D shows module 220 focused to 100 mm and FIG. 2E shows module 220 focused to 50 mm.

Lens 220 is divided into two lens groups G1 (includes lens elements $L_1$ and $L_2$) and G2 (includes $L_3$, $L_4$, $L_5$ and $L_6$) which move relative to each other and additionally together as one lens with respect to the image sensor for focusing. Because of the very shallow DOF that comes with these cameras, capturing a focus stack and building a good image out of it is not trivial. However, methods described below allow to do so.

Some multi-cameras are equipped with a W camera and a Tele camera with Macro capabilities both (or only one of the cameras) having a Phase-Detection Auto-Focus (PDAF) sensor such as a 2PD sensor, i.e. a sensor in which each sensor pixel is divided into two or more sub-pixels and supports depth estimation via calculation of disparity. PDAF sensors take advantage of multiple micro-lenses ("ML"), or partially covered MLs to detect pixels in and out of focus. MLs are calibrated so that objects in focus are projected onto the sensor plane at the same location relative to the lens, see FIG. 3A.

Figure 3A:
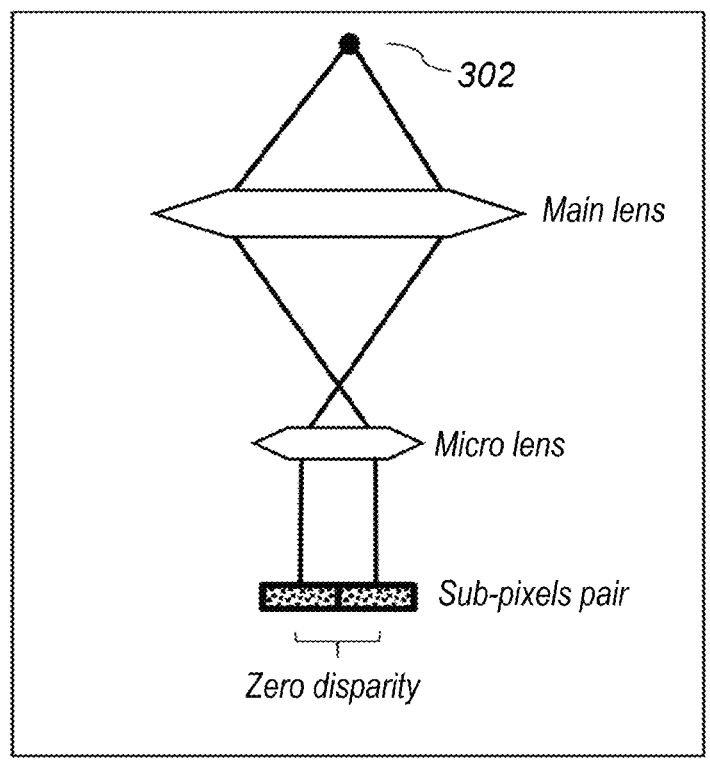
FIG. 3A shows a point object in focus, with a micro-lens projecting the light from the object onto the center of two sub-pixels, causing zero-disparity.
Figure 3B:
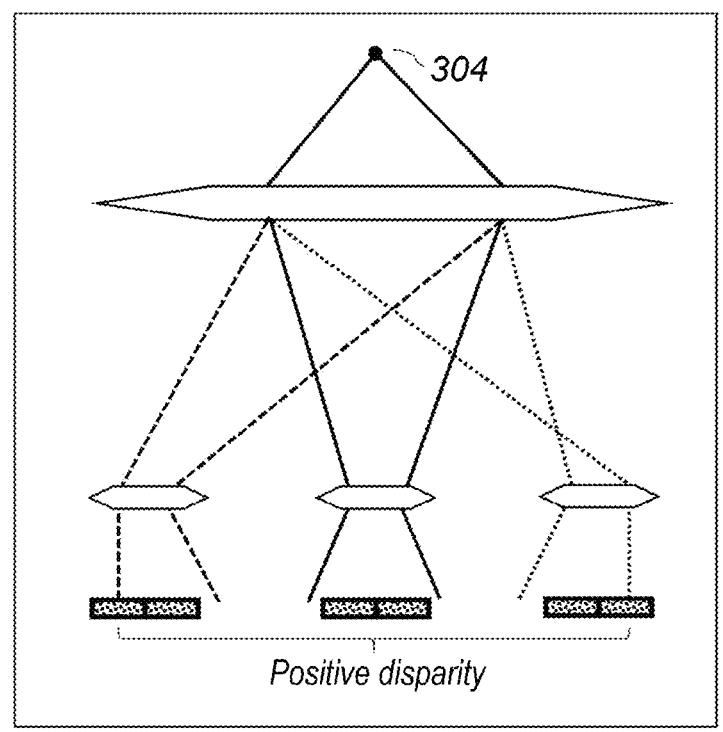
FIG. 3B shows light-rays from the point object in FIG. 3A out of focus.

FIG. 3A shows a point object 302 in focus, with a MLs projecting the light from the object onto the center of two sub-pixels, causing zero-disparity. FIG. 3B shows light-rays from a point object 304 out of focus. "Main-lens" "ML", and "Sub-pixels pair" are illustrated the same way in both FIGS. 3A and 3B. In FIG. 3B, a left ML projects the light from object 304 onto the center of a left sub-pixel. A right ML projects the same object onto a right sub-pixel, causing a positive disparity value of 2. Objects before/after the focal plane (not shown) are projected to different locations relative to each lens, creating a positive/negative disparity between the projections. The PDAF disparity information can be used to create a "PDAF depth map". Note that this PDAF depth map is both crude (due to a very small baseline) and relative to the focal plane. That is, zero-disparity is detected for objects in focus, rather than for objects at infinity. In other embodiments, a depth map may be crated based on image data from a stereo camera, a Time-of-Flight (ToF) or by methods known in the art for monocular depth such as e.g. depth from motion.

Figures 4A, 4B:
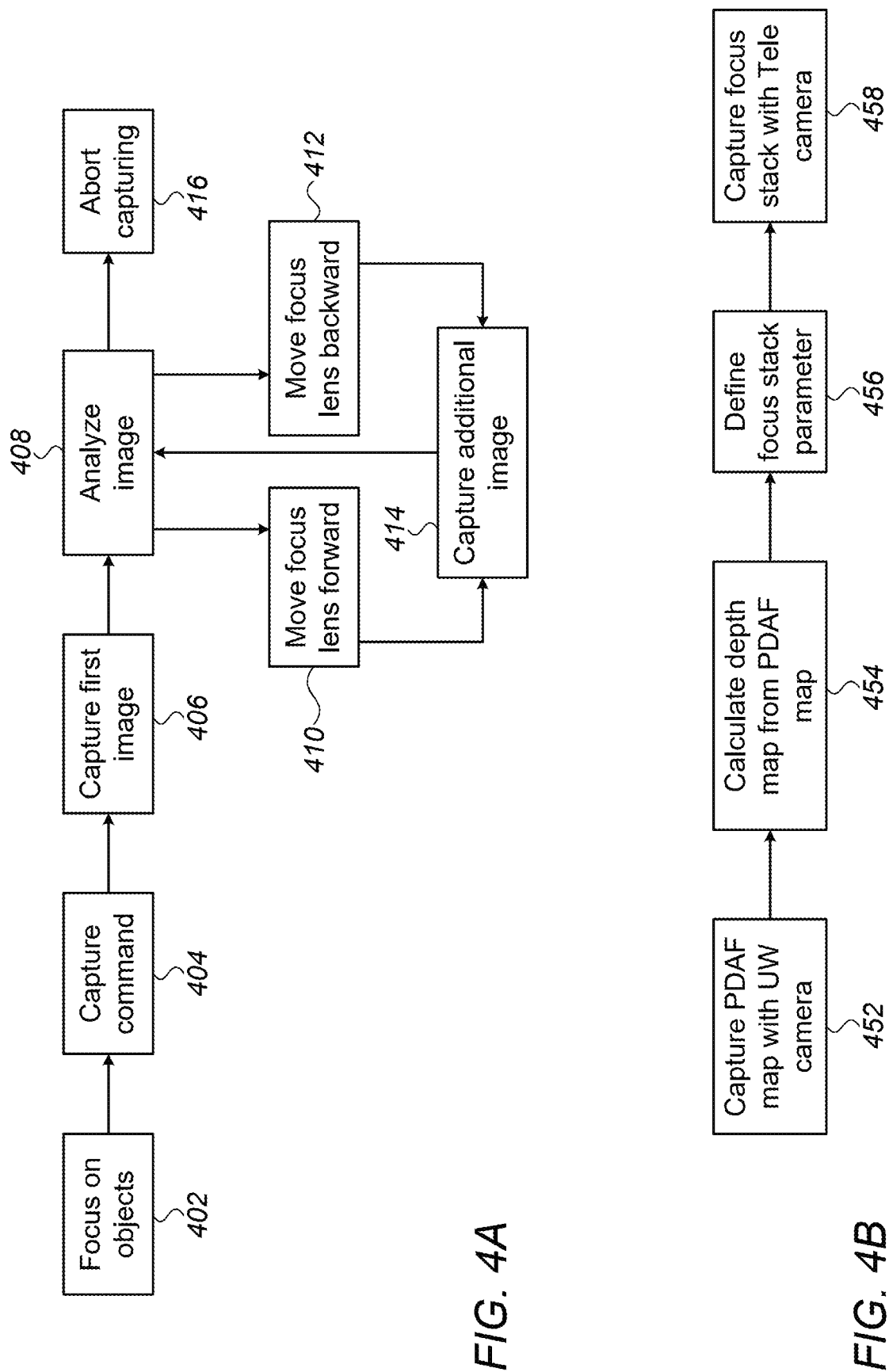
FIG. 4A illustrates a method of capturing a Macro focus stack disclosed herein.
FIG. 4B illustrates another method of generating a focus stack disclosed herein.

FIG. 4A illustrates a method of capturing a Macro focus stack (or "defining a Tele capture strategy") as disclosed herein. The term "focus stack" refers to a plurality of images that are captured in identical imaging conditions (i.e. camera and object are not moving during the capturing of the focus stack but the focus of the lens is moving in defined steps between consecutive image captures). An application controller (AP), for example AP 940 shown in FIG. 9, may be configured to perform the steps of this method. An object is brought into focus in step 402. In some embodiments and for bringing an object or region into focus, a focus peaking map as known in the art may be displayed to a user. If a scanning Tele camera such as camera 140 is used, an object may be brought into focus by detecting the object in the W camera FOV and automatically steering the scanning Tele camera FOV towards this object. An object in the W camera FOV may be selected for focusing automatically by an algorithm, or manually by a human user. For example, a saliency algorithm providing a saliency map as known in the art may be used for automatic object selection by an algorithm. The user gives a capture command in step 404. A first image is captured in the step 406. In step 408, the image is analysed according to methods described below and shown in FIG. 5A and FIG. 5B. In some embodiments, only segments of the image (instead of the entire image) may be analysed. The segments that are analysed may be defined by an object detection algorithm running on the image data from the Macro camera or on the image data of the W camera. Alternatively, the segments of the image that are analysed (i.e. OOIs) may be marked manually by a user. According to the results of this analysis, the lens is moved in defined steps for focusing forward (i.e. the focus moves a step away from the camera) in step 410, or for focusing backward (i.e. the focus moves a step towards the camera) in step 412. The forward or backward focus may depend on a command generated in step 408. A backward focusing command may, for example, be triggered when a plateau A (A') in FIG. 5B (or FIG. 5D) is detected. A forward focusing command may, for example, be triggered when no plateau A (A') in FIG. 5B (or FIG. 5D) is detected. An additional image is captured in step 414. These steps are repeated until the analysis in step 408 outputs a command for reversing the backward focusing or an abort command to abort focus stack capturing. An abort command may, for example, be triggered when a plateau A (A') or E (E') in FIG. 5B (or FIG. 5D) is detected. The abort command ends the focus stack capture in step 416. In another embodiment, step 410 may be replaced by step 412 and step 412 may be replaced by step 410, i.e. first the backward focusing may be performed and then the forward focusing may be performed.

If a scanning Tele camera such as camera 140 is used for capturing a Macro focus stack and defining a Tele capture strategy, an object that covers a FOV segment which is larger than the native Tele FOV ("object FOV") can be captured by multiple focus stacks that cover a different FOV segment of the object FOV each. For example, W camera image data may be used to divide the object FOV in a multitude of smaller (than the Tele FOVN) FOVs with which are captured consecutively with the focus stack capture process as described above, and stitched together after capturing the multitude of FOVs.

If a continuous zoom Tele camera such as camera 120 or camera 130 is used for capturing a Macro focus stack and defining a Tele capture strategy, e.g. depending on the size or content or color of the object FOV, a specific zoom factor may be selected. For example, W camera image data can be used to analyze a Macro object. Based on this analysis, a suitable zoom factor for the continuous zoom Tele camera may be selected. A selection criterion may be that the FOV of the continuous zoom Tele camera fully covers the Macro object. Other selection criteria may be that the FOV of the continuous zoom Tele camera not just fully covers the Macro object, but covers additionally a certain amount of background FOV, e.g. for aesthetic reasons. Yet other selection criteria may be to select a FOV so that the images captured by the continuous zoom Tele camera may have a certain DOF. As a first example, a larger DOF may be beneficial for capturing an object with a focus stack including a smaller number of single images. As a second example, a specific DOF may be beneficial, e.g. as of the Macro image's aesthetic appearance.

FIG. 4B illustrates another method of capturing a focus stack (or defining a Tele capture strategy). An AP (e.g. AP 940 shown in FIG. 9) may be configured to perform the steps of this method. In step 452, a PDAF map is captured with the W camera. In step 454, a depth map is calculated from the PDAF map as known in the art. Focus stack parameters such as focus step size and focus stack brackets are derived in step 456 from the depth map. The focus stack brackets are the upper and lower limits of the focus stack, i.e. they include two planes, a first in-focus plane with the largest object-lens distance in the focus stack, and a second in-focus plane with the smallest object-lens distance in the focus stack. A plurality of images with shifted focus is captured between these two limits. The focus step size defines the distance between two consecutive in-focus planes that were captured in the focus stack. A focus plane may have a specific depth defined by the DOF (focus plane located in center). The parameters defined in step 456 may be used to control the camera. For example, the parameters may be fed into a standard Burst mode feature for focus stack capture, as supplied for example on Android smartphones. In step 458, the focus stack is captured according to the parameters. In other embodiments, the PDAF map in step 452 may be captured not by a W camera, but by a Macro capable Tele camera. The PDAF map of the Tele camera may exhibit a higher spatial resolution, which may be desirable, and a stronger blurring of out-of-focus areas, which may be desirable or not. The stronger blurring of out-of-focus areas may be desirable for an object having a shallow depth, e.g. a depth of <1 mm. The stronger blurring of out-of-focus areas may not be desirable for an object having a larger depth, e.g. a depth of >2.5 mm. A strong blurring may render a depth calculation as performed in step 454 impossible.

In some embodiments, in step 452, PDAF image data may be captured from specific scene segments only, e.g. for a ROI only. In other embodiments, in step 452, PDAF image data may be captured from the entire scene, but depth map calculation in step 454, may be performed for segments only. The specific scene segments may be identified by image analysis performed on image data from a UW or a W or the Tele camera. PDAF maps may be captured in step 452 not only from single images, but also from a video stream.

In some embodiments, instead of calculating a depth map in step 454, a depth map or image data for calculating a depth map may be provided by an additional camera.

In some embodiments, a different analysis method may be applied in order to analyse the entire Macro scene at only one (or only a few) focus position(s). From this analysis, a preferred focus stack step size and focus stack range may be derived. These values are then feed into a standard Burst mode feature for focus stack capture.

In some embodiments, for focus stack capture in step 458, imaging settings such as the values for white-balance and exposure time may be kept constant for all images captured in the focus stack.

Capturing a focus stack comprising Macro images with shallow DOF may require actuation of the camera's lens with high accuracy, as the DOF defines a minimum accuracy limit for the focusing process. The requirements for actuation accuracy may be derived from the images' DOF. For example, an actuation accuracy may be required that allows for controlling the location of the focus plane with an accuracy that is larger than the DOF by a factor of 2-15. As an example, consider a focus stack including Macro images having a DOF of 50 µm, i.e. segments of the scene that are located less than 25 µm distance from the focus plane are in-focus. The minimum accuracy for focusing would accordingly be 25 µm-3 µm.

Optical image stabilization (OIS) as known in the art may be used during focus stack capturing. OIS may be based on actuating the lens or the image sensor or the OPFE of camera 910. In some embodiments, depth data of the Macro scene may be used for OIS.

Figure 5A:
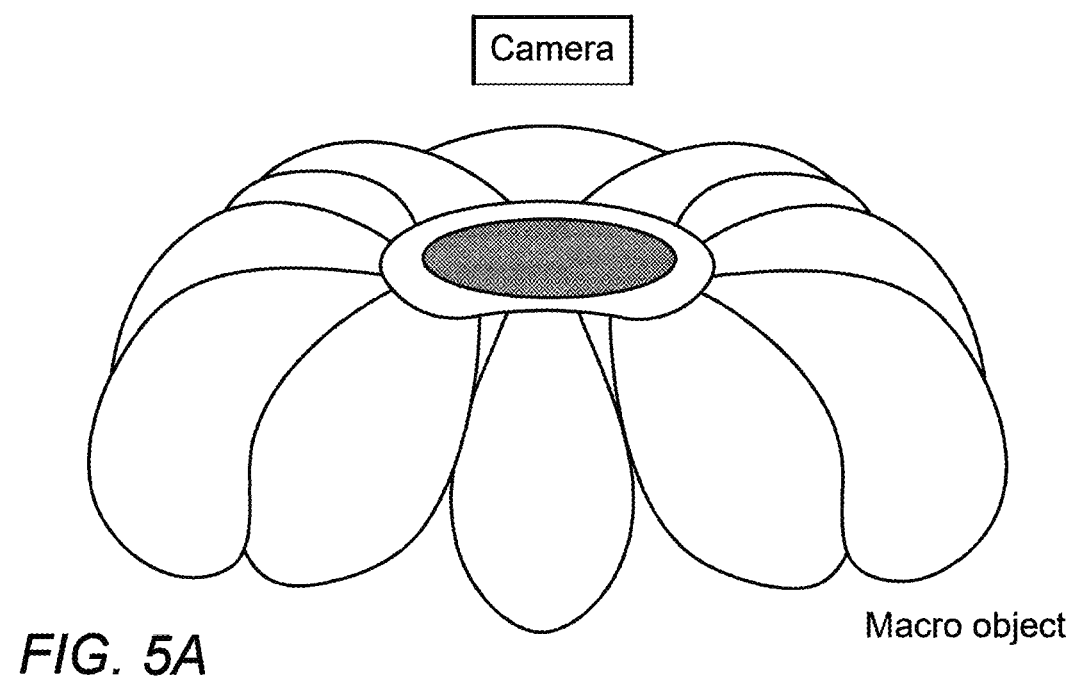
FIG. 5A shows an exemplary Macro object and setup for capturing the Macro object.

FIG. 5A shows exemplarily a Macro object (here Flower) and a camera for capturing the Macro object (not in scale). The flower is captured from a top position (marked by "camera").

Figure 5B:
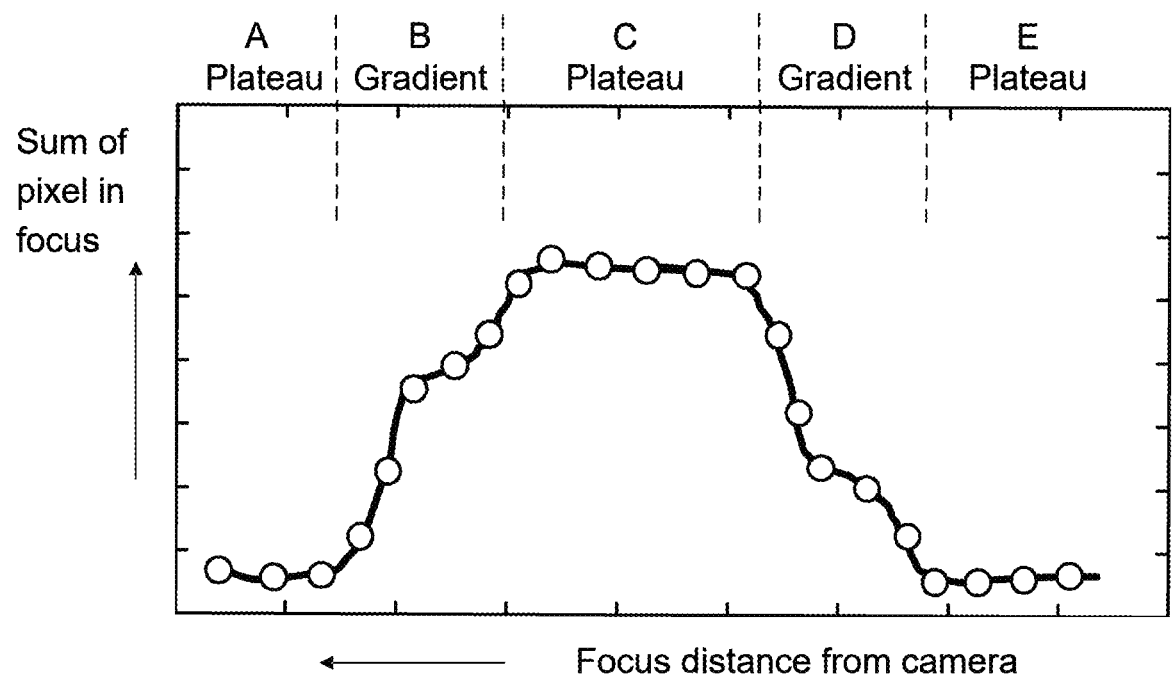
FIG. 5B shows an output graph for the Macro setup of FIG. 5A.

FIG. 5B shows an exemplary output graph for the Macro setup of FIG. 5A obtained using a method described in FIG. 4A. The dots in the graph represent the results of the analysis for a specific image of the focus stack, i.e. each image in the focus stack is analysed during focus stack capturing as described above, where the analysis provides a number (sum of pixels in focus) for each image. These numbers may be plotted as illustrated here. The analysis may use functions as known in the art such as e.g. Laplacian of Gaussians, or Brenner's focus measure. An overview of suitable functions may be found in Santos et al., "Evaluation of autofocus functions in molecular cytogenetic analysis", 1997, Journal of Microscopy, Vol. 188, Pt 3, December 1997, pp. 264-272.

The analysis output is a measure for the amount of pixels in each image that are in-focus. The larger the number output for a specific image, the higher the overall number of pixels in the image that are in focus. The assumption of the focus stack analysis is that a major part of Macro objects exhibits an analysis curve characterized by common specific features. The curve is characterized (starting from a left image side, i.e. from a camera-scene setup where the focus is farther away than the Macro object) by a plateau A (focus farther away than object, so almost no pixel is in-focus and there is a small output number), followed by a positive gradient area B (where first the farthest parts of the Macro objects are in-focus and then larger parts of the Macro object are in-focus), followed by a plateau C (where for example the center of the Macro object and large parts of the object are in-focus), which is followed by a negative gradient D (where the focus moves away from Macro object center), followed by a plateau E. The abort command as described in FIG. 4A is triggered by detecting plateau A or plateau E. Depending on which focus position the focus stack capture was started, the focus stack capture will be aborted or the direction of focus shifting will be switched (from towards the camera to away from the camera or the other way around). In general, focus stack capture may be started with a focus position where a part or point of the Macro object is in focus. The analysis will output a high number for the first image. Then focus is moved away from the camera, which means that analysis output moves on the plateau C (towards the left in the graph), until it reaches the gradient area B in the graph and in the end the plateau area A. If there is no further increase in the number outputted from the analysis, the focus is moved back to the first position (at plateau C) and focus is shifted towards the camera. The same steps as described above are performed till in the end plateau E is reached. Here the focus stack capture process is finished.

Figure 5C:
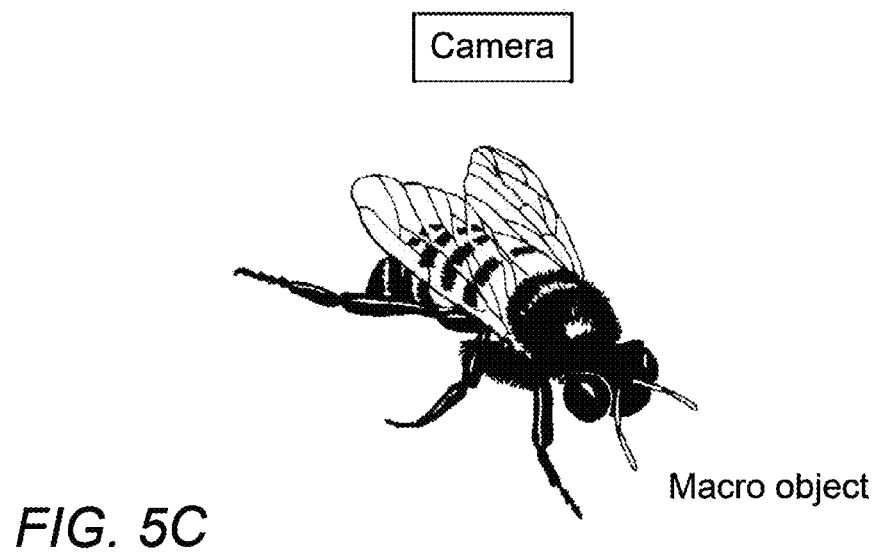
FIG. 5C shows another exemplary Macro object and setup for capturing the Macro object.
Figure 5D:
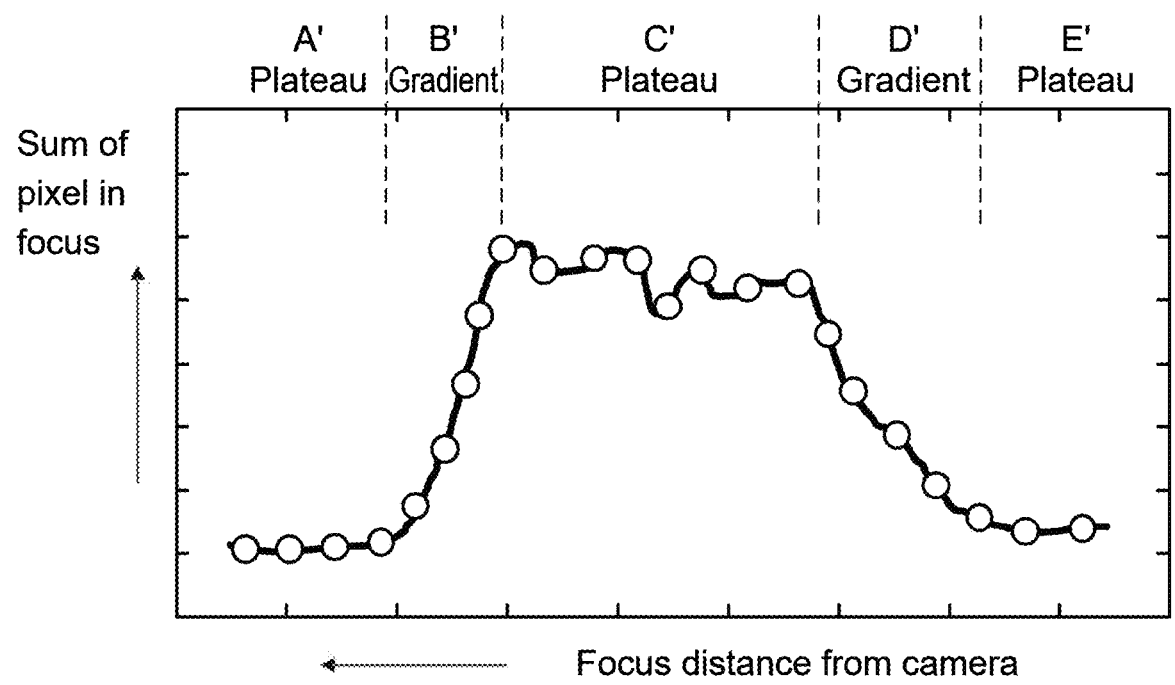
FIG. 5D shows an output graph for the Macro setup of FIG. 5C.

FIG. 5C shows another exemplary Macro object (here a bee) and another camera for capturing the Macro object (not in scale). FIG. 5D shows another exemplary output graph for the Macro setup of FIG. 5C using a method described in FIG. 4. Although varying in details because of the different object depth distribution, features A'-E' here are similar to features A-E in FIG. 5B.

Figure 6:
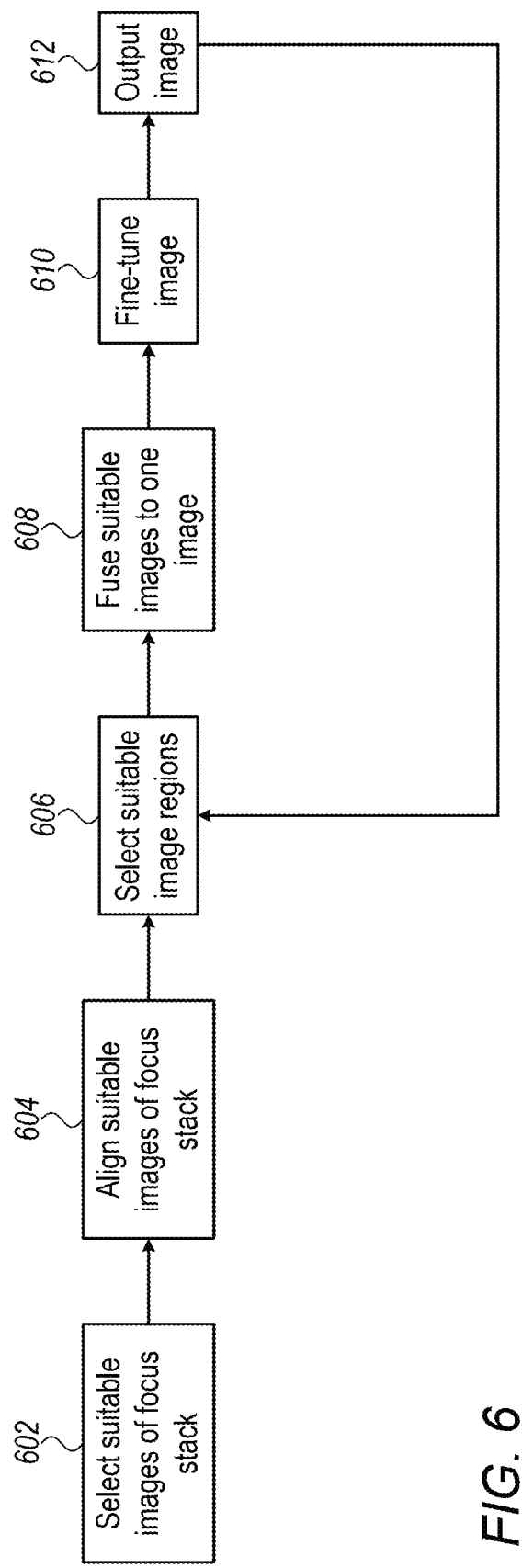
FIG. 6 illustrates a method of generating single Macro images from a plurality of images of a focus stack.

The Tele images of the focus stack captured according to methods described e.g. in FIG. 4A, FIG. 4B and FIG. 5A-D are the input Macro images that may be further processed, e.g. by the method described in FIG. 6.

FIG. 6 illustrates a method of generating single Macro images from a plurality of images of a focus stack. An AP such as AP 940 may be configured to perform the steps of this method. Suitable images of the focus stack are selected by analysis methods known in the art in step 602. Criteria that may disqualify an image as "suitable" image may include: significant motion blur (e.g. from handshake) in an image, redundancy in captured data, or bad focus. Only selected suitable images are used further in the process. The suitable images are aligned with methods as known in the art in step 604. Suitable image regions in the aligned images are selected in step 606. Selection criteria for "suitable" regions may include the degree of focus of an area, e.g. whether an area is in focus or has a certain degree of defocus blur. The choice of selection criteria depends on the input of a user or program. A user may wish an output image with a Macro object that is all-in-focus (i.e. image with a depth of field larger than the depth of the Macro object), meaning that all the parts of the Macro object are in focus simultaneously. However, the all-in-focus view generally does not represent the most pleasant image for a human observer (as human perception comes with certain amount of blurring by depth, too), so an image with a certain focus plane and a certain amount of blurred area may be more appealing. "Focus plane" is the plane formed by all points of an un-processed image that are in focus. Images from a focus stack generated as described in FIGS. 4A-B and a selection of suitable images in step 606 may allow to choose any focus plane and any amount of blurring in the output image 612 continuously. The amount of blurring of image segments that are not in focus may depend on their location in a scene. The amount of blurring may be different for image segments of object segments that are further away from the camera by some distance d with respect to the focus plane, than for image segments that are closer to the camera than the focus plane by the same distance d. The continuous control of the focus plane's position and the depth of field of the new Macro image may be performed after capturing the focus stack ("post-capture"). In some embodiments, continuous control of the focus plane's position and the depth of field of the new Macro image may be performed before capturing the focus stack ("pre-capture") as well and e.g. enabled by showing a preview video stream to a user. The selected images are fused into a single image with methods known in the art in step 608. In some embodiments and optionally, the fusion in step 608 may use depth map information, estimated e.g. using depth from focus or depth from defocus methods known in the art. In other embodiments, depth map information from PDAF (see FIG. 3A-B) may be used. The PDAF information may be provided from the image sensor of the UW camera or from the W camera or from the Tele camera with Macro capability. In some embodiments, PDAF data may be captured by the Tele camera simultaneously with capturing the Tele focus stack images, i.e. a stack of PDAF images is captured under identical focus conditions as the focus stack image. From this PDAF image stack a depth map may be calculated. E.g. one may use in-focus image segments from a single PDAF image only, as they can be assigned to a specific depth with high accuracy. By fusing the depth estimation data from all the in-focus image segments of the PDAF image stack a high-quality depth map may be generated.

In some embodiments, both Tele image data and Wide image data may be fused to one image in step 608.

In other embodiments, only a subset of the images selected in step 602 may be fused into a single image in step 608 and output in step 612. For example, a subset of only 1, only 2, or only 3, or only 4, or only 5 images may be fused into one single image in step 608 and output in step 612. In yet another embodiment, only one of the images selected in step 602 may be output in step 612. The single output image is fine-tuned in step 610 to finalize results by, e.g. reduce noise. The fine tuning may include smoothening images seams, enhancements, filters like radial blur, chroma fading, etc. The image is output in step 612.

In other embodiments, selection of suitable image regions in step 606 may be based on an image analysis performed on images from a W camera. Because of the wider FOV and larger DOF of a W camera (with respect to a Macro capable Tele camera), it may be beneficial to additionally use W image data for generating the single Macro images, e.g. for object identification and segmentation. For example, a Macro region of interest (ROI) or object of interest (OOI) may be detected in $FOV_w$ before or during focus stack capturing with the Macro capable Tele camera. The ROI or OOI may be segmented according to methods known in the art. Segmentation means identification of coordinates of the FOV segment that contains the ROI or OOI. Via calibration of the $FOV_w$ and $FOV_T$, these coordinates are translated to the FOV coordinates. The coordinates of ROIs or OOIs may be used for selection of suitable image regions in step 606. In some embodiments, the segmentation analysis may be performed on single images. In other embodiments, the segmentation analysis may be performed on a video stream, i.e. on a sequence of single images.

In some embodiments, image information of the W camera may be used for further tasks. One or more W images may be used as a ground truth "anchor" or reference image in the Macro image generation process. Ground truth refers here to W image information about a scene segment that is significantly more complete than the Tele image information of the same scene segment. A single W image provides significantly more information about a Macro object than a single Tele image. As an example one may think of an ROI or OOI that is mostly in-focus and fully visible in a single W image but only partly visible in a single Tele image, e.g. because of the significantly shallower Tele DOF. The W ground truth or reference image may be used as ground truth anchor in the following steps of the method described in FIG. 6:

In step 602, a W image may be used for selection of suitable images. The ground truth may e.g. allow to identify Tele images that exceed a certain threshold of focus blur or motion blur.

In step 604, a W image may be used as a reference image for aligning images. In one example the Tele images of the focus stack may all be aligned with reference to the W reference image. In another example, the Tele images of the focus stack may first all be aligned with reference to the W reference image, and for more detailed alignment the Tele images may be aligned with reference to other Tele images of the focus stack.

In step 606, a W image may be used for defining suitable image regions as described above.

In step 608, a W image may be used for correction of fusion artifacts. Fusion artifacts are defined as visual features that are not present in the actual scene but that are an undesired byproduct of the image fusion process.

In step 610, a W image may be used to identify image segments in the fused image that exhibit undesired features and that may be corrected. Such undesired features may e.g. be misalignments of images, unnatural color differences or blurring caused by e.g. de-focus or motion. De-focus blur may e.g. be induced by estimation errors in the depth map used in image fusion step 608.

Figure 7:
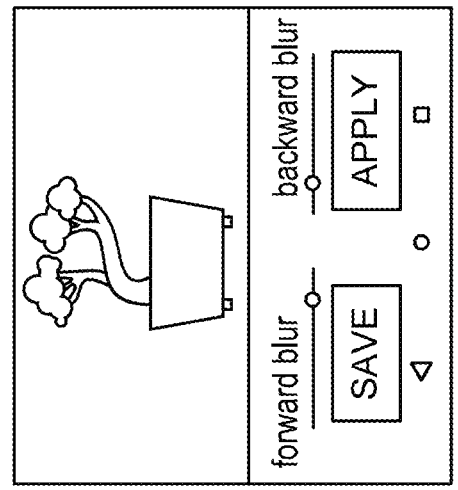
FIG. 7 shows a graphic user interface (GUI) that a user may use to transmit a command to modify the appearance of the output image.

In yet another embodiment, the method described above may not involve any image processing such as described in steps 608-612, but may be used to select a single image from the focus stack. The selection may be performed automatically (e.g. by analyzing the focus stack for the sharpest, most clear and well-composed image with a method as described in FIG. 5A-5D) or manually by a human user. FIG. 7 shows a graphical user interface (GUI) that a user may use to transmit a command to modify the appearance of the output image, e.g. a user may transmit a command (e.g. "forward blur" and "backward blur") for a more blurred image or an image where larger parts are in focus. "Background blur" and "forward blur" refer to the blur options as described in FIGS. 8A, 8B. In one embodiment, in case the user command is to modify the appearance of an image, the method will be re-performed from step 606 on, however with a different set of selection criteria. In another embodiment, in case the user command is to modify the appearance of an image, a blurring algorithm (artificial blurring) may be applied to the output image to form another output image. The focus plane may be changed by marking a new image segment that should be in-focus by touching the device screen. The blur may be changed according to the wishes of the user. The user may wish to modify the DOF of the displayed image, e.g. from an all-in-focus image (i.e. infinite DOF) to a more shallow DOF. A user may wish to modify the focus plane of an image that is not all-in-focus. A user may modify the image, and a pre-view image generated by an estimation indicating a projected output image may be displayed. If a user performs a click on "Apply", a full algorithm may be applied as described in FIG. 6.

Figure 8A:
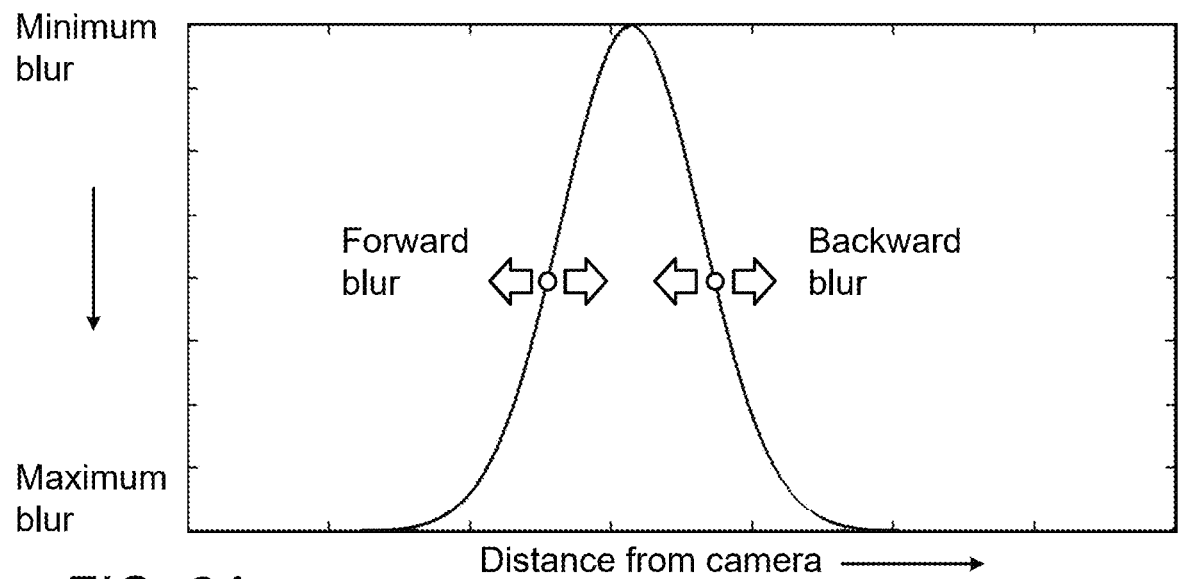
FIG. 8A shows a symmetric blur function.
Figure 8B:
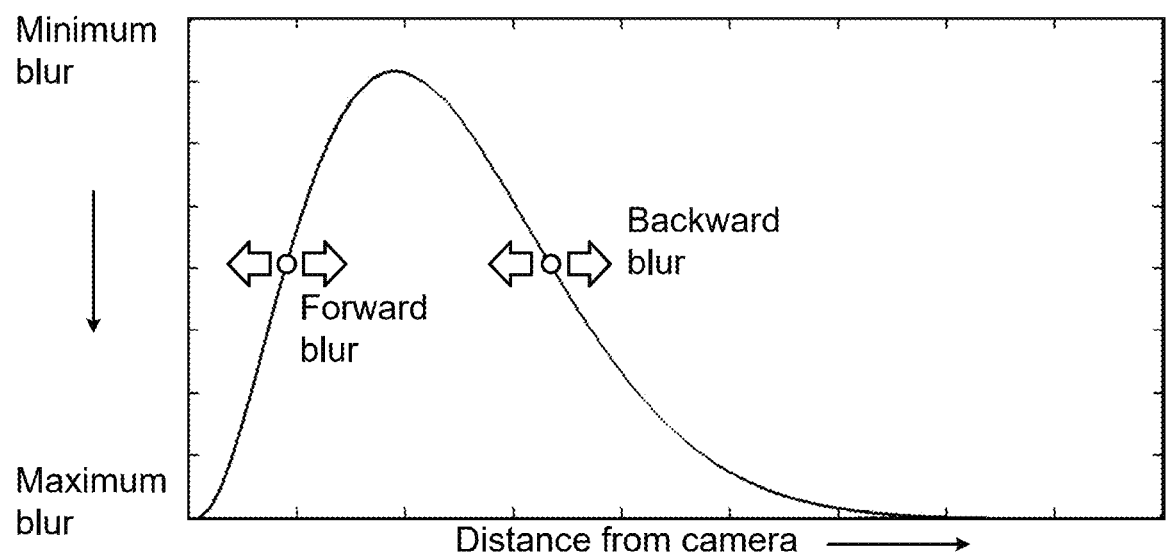
FIG. 8B shows an asymmetric blur function with functionality as described in FIG. 8A.

FIG. 8A shows a symmetric blur function. By moving the sliders (forward/backward blur) in FIG. 8A, a user may move linearly on the X axis, with blur applied to the image as indicated on the Y axis. FIG. 8B shows an asymmetric blur function with functionality as described in FIG. 8A. Application of the blur function enables the user to blur differently the foreground and the background. For example, there are cases where forward blur may be unwanted at all, from an artistic point of view. Asymmetric blur enables this possibility.

In some embodiments, further image features such as e.g. artificial lightning may be provided. Artificial lightning means that the lightning scenario in the scene can be changed by a user or a program, e.g. by artificially moving a light source within a scene. For artificial lightning, the presence of a depth map may be beneficial.

Figure 9:
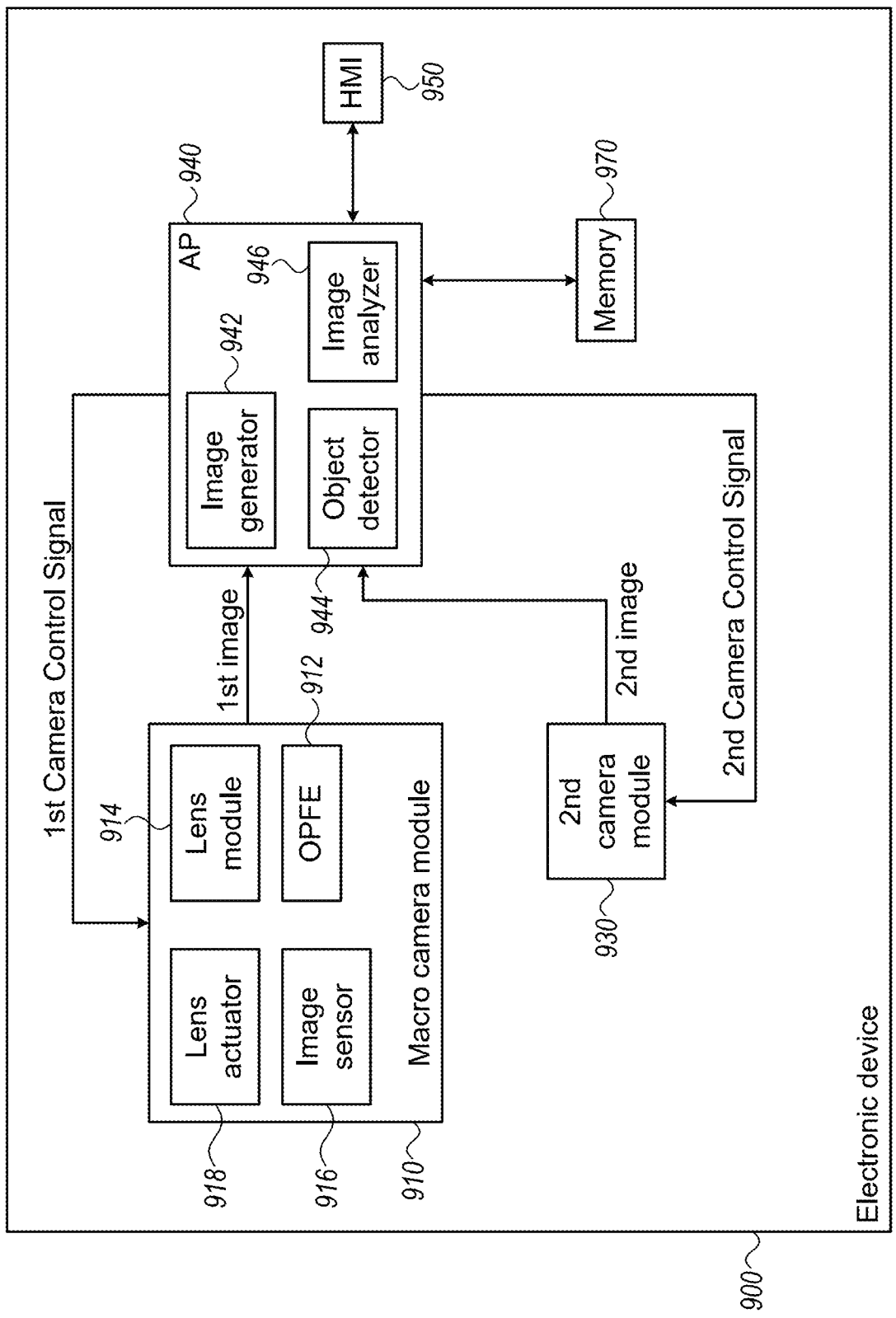
FIG. 9 shows a system for performing methods disclosed herein.

FIG. 9 shows a system 900 for performing methods as described above. System 900 comprises a first Tele camera module (or simply "Tele camera") 910. Tele camera 910 may be a Macro capable folded Tele camera, a double-folded Tele camera, a pop-out Tele camera, a scanning folded Tele camera, or an upright (non-folded) Tele camera. If camera 910 is a folded camera, it comprises an optical path folding element (OPFE) 912 for folding an optical path by 90 degrees, a lens module 914 and an image sensor 916. A lens actuator 918 performs a movement of lens module 914 to bring the lens to different lens states for focusing and optionally for OIS. System 910 may comprise an additional, second camera module 930, and an application processor (AP) 940. The second camera module 930 may be a W camera or a UW camera. In some embodiments, both a W camera and a UW camera may be included. AP 940 comprises an image generator 942 for generating images, and an image analyzer 946 for analyzing images as described above, as well as an object detector 944. A human machine interface (HMI) 950 such as a smartphone screen allows a user to transmit commands to the AP. A memory element 970 may be used to store image data. Calibration data for calibration between camera 910 and second camera module 930 may be stored in memory element 970 and/or in additional memory elements (not shown). The additional memory elements may be integrated in the camera 910 and/or in the second camera module 930. The additional memory elements may be EEPROMs (electrically erasable programmable read-only memory). Memory element 970 may e.g. be a NVM (non-volatile memory).

Figure 10:
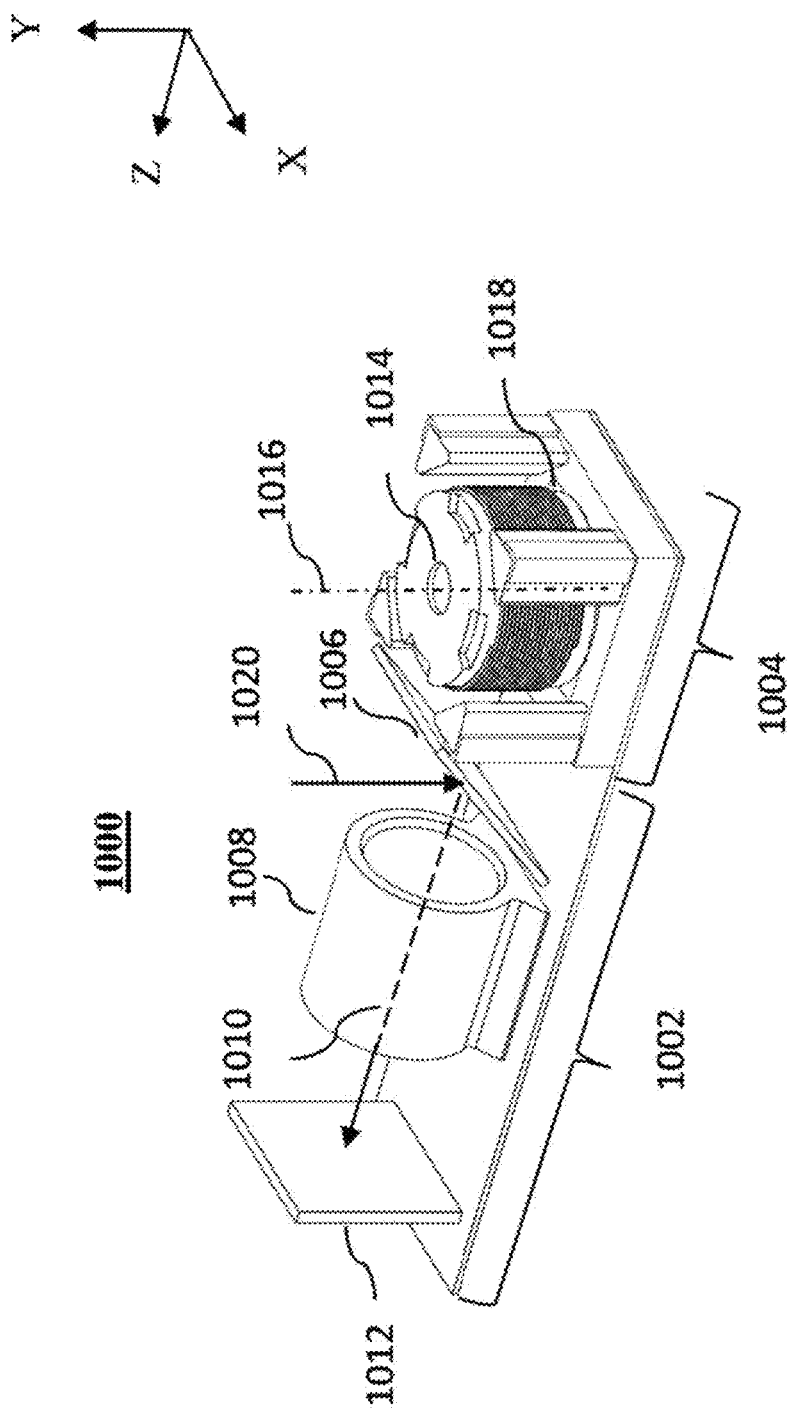
FIG. 10 shows an exemplary dual-camera.

FIG. 10 illustrates a dual-camera (which may be part of a multi-camera with more than two cameras) known in the art and numbered 1000, see e.g. co-owned international patent application PCT/IB2015/056004. Dual-camera 1000 comprises a folded Tele camera 1002 and a Wide camera 1004. Tele camera 1002 comprises an OPFE 1006, a lens 1008 that may include a plurality of lens elements (not visible in this representation, but visible e.g. in FIG. 1C-H) with an optical axis 1010 and an image sensor 1012. Wide camera 1004 comprises a lens 1014 with an optical axis 1016 and an image sensor 1018. OPFE 1006 folds the optical path from a first optical path 1020 which is substantially parallel to optical axis 1016 to a second optical path which is substantially parallel optical axis 1010.

While this disclosure has been described in terms of certain embodiments and generally associated methods, alterations and permutations of the embodiments and methods will be apparent to those skilled in the art. The disclosure is to be understood as not limited by the specific embodiments described herein, but only by the scope of the appended claims.

Furthermore, for the sake of clarity the term "substantially" is used herein to imply the possibility of variations in values within an acceptable range. According to one example, the term "substantially" used herein should be interpreted to imply possible variation of up to 5% over or under any specified value. According to another example, the term "substantially" used herein should be interpreted to imply possible variation of up to 2.5% over or under any specified value. According to a further example, the term "substantially" used herein should be interpreted to imply possible variation of up to 1% over or under any specified value.

All references mentioned in this specification are herein incorporated in their entirety by reference into the specification, to the same extent as if each individual reference was specifically and individually indicated to be incorporated herein by reference. In addition, citation or identification of any reference in this application shall not be construed as an admission that such reference is available as prior art to the present application.

What is claimed is:

1. A mobile device, comprising:
   a screen;
   a Tele camera comprising a lens with a plurality of N lens elements, a Tele field-of-view ($FOV_T$), an effective focal length (EFL) in the range of 7 mm to 40 mm, the Tele camera operational to focus to a Macro object at a distance or a set of distances in the range between 10 cm and 35 cm and to capture Macro images, each Macro image having a single image depth-of-field (SI-DoF); and
   an application processor (AP) configured to analyze image data and estimate an amount of Macro image data of the Macro object that is in-focus,
   wherein depending on the amount of the image data of the Macro object that is in-focus, the AP is further configured to provide an option to a user to capture the Macro object with a DoF larger than SI-DoF,
   wherein the option to the user is displayed by the screen and selectable by touching the screen,
   wherein the Macro object is captured with the Tele camera in a sequence of Macro images with a focus plane shifted from one captured Macro image to another captured Macro image, and
   wherein the AP configured to generate from the sequence of captured Macro images a new Macro image having a DoF larger than SI-DoF.

2. The mobile device of claim 1, wherein the sequence of Macro images is captured by shifting the focus plane a step away from the Tele camera and by shifting the focus plane a step towards the Tele camera.

3. The mobile device of claim 1, wherein the new Macro image includes image data of between 2 and 5 Macro images of the sequence of Macro images.

4. The mobile device of claim 1, wherein the new Macro image includes image data of more than 5 Macro images of the sequence of Macro images.

5. The mobile device of claim 1, wherein an object-to-image magnification is in a range between 1:5 and 25:1.

6. The mobile device of claim 1, wherein the EFL is in the range of 10 mm to 30 mm.

7. The mobile device of claim 1, wherein the EFL is in the range of 10 mm to 20 mm.

8. The mobile device of claim 1, wherein the AP is configured to analyze Macro images of the Tele camera to estimate the amount of Macro image data that are in-focus.

9. The mobile device of claim 1, wherein the AP is configured to analyze phase detection auto-focus (PDAF) image data to estimate the amount of Macro image data that are in-focus.

10. The mobile device of claim 1, wherein the AP is configured to use depth map image data to estimate the amount of Macro image data that are in-focus.

11. The mobile device of claim 1, further comprising a Wide camera having a Wide field-of-view ($FOV_W$) larger than $FOV_T$.

12. The mobile device of claim 11, wherein the AP is configured to analyze image data of the Wide camera to estimate the amount of Macro image data that are in-focus.

13. The mobile device of claim 1, wherein the lens is divided into a first lens element group and a second lens element group, and wherein focusing of the Tele camera is performed by relative movement of the first lens element group and the second lens element group.

14. The mobile device of claim 1, wherein for estimating the amount of image data that are in-focus, the AP is configured to use an object detection algorithm.

15. The mobile device of claim 1, wherein the Tele camera is an upright non-folded camera.

16. The mobile device of claim 1, wherein the Tele camera is a folded camera.

17. The mobile device of claim 1, wherein the Tele camera is a pop-out camera.

18. The mobile device of claim 11, further comprising an Ultra-Wide camera having an Ultra-Wide field-of-view ($FOV_{UW}$) larger than $FOV_W$.

19. The mobile device of claim 1, wherein the mobile device is a smartphone.

20. The mobile device of claim 1, wherein the mobile device is a tablet.

* * * * *